United States Patent
Tanaka et al.

(10) Patent No.: US 11,487,001 B2
(45) Date of Patent: Nov. 1, 2022

(54) IMAGE ANALYSIS DEVICE, IMAGE ANALYSIS METHOD, AND COMPUTER-READABLE RECORDING MEDIUM

(71) Applicant: NEC Corporation, Tokyo (JP)

(72) Inventors: Taichi Tanaka, Tokyo (JP); Osamu Hoshuyama, Tokyo (JP)

(73) Assignee: NEC CORPORATION, Tokyo (JP)

(*) Notice: Subject to any disclaimer, the term of this patent is extended or adjusted under 35 U.S.C. 154(b) by 621 days.

(21) Appl. No.: 16/470,301

(22) PCT Filed: Dec. 20, 2017

(86) PCT No.: PCT/JP2017/045631
§ 371 (c)(1),
(2) Date: Jun. 17, 2019

(87) PCT Pub. No.: WO2018/123748
PCT Pub. Date: Jul. 5, 2018

(65) Prior Publication Data
US 2020/0096628 A1    Mar. 26, 2020

(30) Foreign Application Priority Data
Dec. 27, 2016   (JP) .............................. JP2016-252479

(51) Int. Cl.
*G06T 7/60* (2017.01)
*G01S 13/90* (2006.01)

(52) U.S. Cl.
CPC ............ *G01S 13/9023* (2013.01); *G06T 7/60* (2013.01); *G06T 2207/10044* (2013.01)

(58) Field of Classification Search
None
See application file for complete search history.

(56) References Cited

U.S. PATENT DOCUMENTS

| 8,587,471 B2 | 11/2013 | Ferretti et al. |
| 2011/0163911 A1 | 7/2011 | Costantini et al. |
| 2018/0011187 A1* | 1/2018 | Katayama ........... G01S 13/9023 |

FOREIGN PATENT DOCUMENTS

| JP | 8-94747 A | 4/1996 |
| JP | 2012-14628 A | 1/2012 |

(Continued)

OTHER PUBLICATIONS

Michaelsen et al. (Utilizing phase for the grouping of PS in urban high-resolution in-SAR-images, X Munich, Germany, Apr. 11-13, 2011, hereinafter Michaelsen). (Year: 2011).*

(Continued)

*Primary Examiner* — Samuel D Fereja
(74) *Attorney, Agent, or Firm* — Sughrue Mion, PLLC

(57) ABSTRACT

An image analysis device that ease association between an SAR image and an object is provided. The image analysis device includes: a stable reflection point identification unit that identifies, based on a plurality of synthetic aperture radar (SAR) images, stable reflection points at which reflection is stable in the plurality of SAR images; a phase identification unit that identifies a phase at each of the stable reflection points, based on the plurality of SAR images and a location of the stable reflection point in the plurality of SAR images; and a clustering means that clusters the stable reflection points, based on a Euclidian distance between each of the stable reflection points and a correlation of the phases at each of the stable reflection points.

15 Claims, 18 Drawing Sheets

(56) References Cited

FOREIGN PATENT DOCUMENTS

JP          2012-523030 A     9/2012
WO            00/72045 A1    11/2000

OTHER PUBLICATIONS

Michaelsen, Eckart, et al., "Utilizing Phase for the Grouping of PS in Urban High-Resolution in-SAR-Images", Joint Urban Remote Sensing Event (JURSE 2011), Apr. 13, 2011, pp. 189-192 (4 pages).

Schunert, Alexander, et al., "Grouping of Persistent Scatterers in high-resolution SAR data of urban scenes", ISPRS Journal of Photogrammetry and Remote Sensing, 2012, vol. 73, pp. 80-88 (9 pages).

Goel, Kanika, et al., "Improving The Reference Network In Wide-Area Persistent Scatterer Interferometry For Non-Urban Areas", Geoscience and Remote Sensing Symposium(IGARSS), 2016 IEEE International, Jul. 15, 2016, pp. 1448-1451 (4 pages).

Lu, Ping, et al., "Persistent Scatterers Interferometry Hotspot and Cluster Analysis (PSI-HCA) for detection of extremely slow-moving landslides", International Journal of Remote Sensing, Jan. 20, 2012, vol. 33, No. 2, pp. 466-489 (25 pages).

International Search Report dated Mar. 20, 2018 from the International Searching Authority in counterpart International Application No. PCT/JP2017/045631.

Written Opinion dated Mar. 20, 2018 from the International Bureau in counterpart International Application No. PCT/JP2017/045631.

\* cited by examiner

IMAGE ANALYSIS DEVICE, IMAGE ANALYSIS METHOD, AND COMPUTER-READABLE RECORDING MEDIUM

This application is a National Stage Entry of PCT/JP2017/045631 filed on Dec. 20, 2017, which claims priority from Japanese Patent Application 2016-252479 filed on Dec. 27, 2016, the contents of all of which are incorporated herein by reference, in their entirety.

TECHNICAL FIELD

The present invention relates to an image analysis device, an image analysis method, and a computer-readable recording medium.

BACKGROUND ART

An SAR image acquired by a synthetic aperture radar (SAR) is used in various fields. For example, analysis of a structural object by using an SAR image is being performed.

PTL 1 describes a procedure relating to radar measurement of a motion of an urban area and a landslide region. A technique described in PTL 1 analyzes N-1 difference interference images for the same image by using a reference digital elevation model, and identifies a permanent scatterer.

CITATION LIST

Patent Literature

[PTL 1] International Publication No. WO 00/072045

SUMMARY OF INVENTION

Technical Problem

When an SAR image system is acquired, generally, an object of observation such as a ground surface or a structural object and each location of an image are associated with each other. However, it may be difficult to associate a point in an SAR image with an object. In other words, for the technique described in PTL 1, a technique for further easing association between an SAR image and an object is demanded.

The present invention has been made in order to solve the above-described problem, and a main object of the present invention is to provide an image analysis device that ease association between an SAR image and an object.

Solution to Problem

One aspect of an image analysis device of the present invention includes: stable reflection point identification means for identifying, based on a plurality of synthetic aperture radar (SAR) images, stable reflection points at which reflection is stable in the plurality of SAR images; and clustering means for clustering each of the stable reflection points, using each of Euclidian distances between the stable reflection points and each of correlations of phases of the stable reflection points.

One aspect of an image analysis method of the present invention includes: identifying, based on a plurality of synthetic aperture radar (SAR) images, stable reflection points at which reflection is stable in the plurality of SAR images; and clustering each of the stable reflection points, using each of Euclidian distances between the stable reflection points and each of correlations of phases of the stable reflection points.

One aspect of the present invention is a non-transitory computer readable storage medium storing a program. The program causes a computer to execute processing of:
identifying, based on a plurality of synthetic aperture radar (SAR) images, stable reflection points at which reflection is stable in the plurality of SAR images; and
clustering each of the stable reflection points, using each of Euclidian distances between the stable reflection points and each of correlations of phases of the stable reflection points.

Advantageous Effects of Invention

The present invention is able to provide an image analysis device that ease association between an SAR image and an object.

EXAMPLE EMBODIMENT

Figure 18:
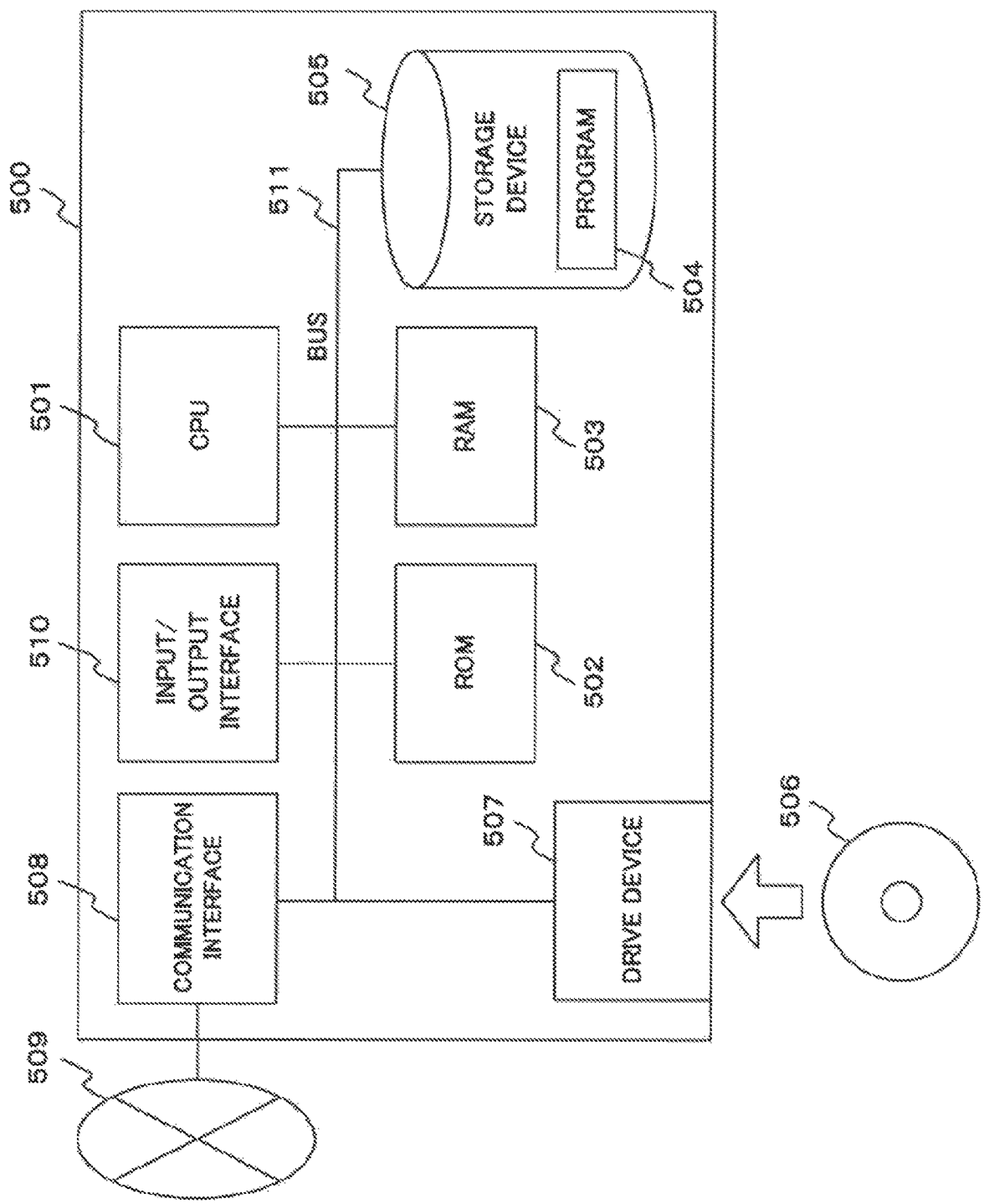
FIG. 18 is a diagram illustrating an example of an information processing device that achieves an image analysis device in example embodiments of the present invention.

Example embodiments of the present invention are described with reference to the accompanying drawings. In the example embodiments of the present invention, components of each device represent a block of a function unit. A part or all of the components of each device are achieved by any combination of an information processing device 500, for example, as illustrated in FIG. 18 and a program. The information processing device 500 includes, as one example, a configuration as follows.

A central processing unit (CPU) 501,
A read only memory (ROM) 502,
A random access memory (RAM) 503,
A program 504 loaded on the RAM 503,
A storage device 505 that stores the program 504,
A drive device 507 that executes reading/writing on/from a recording medium 506,
A communication interface 508 for connection to a communication network 509,
An input/output interface 510 that inputs/outputs data, and
A bus 511 that connects each component.

The components of each device in the example embodiments can be achieved by which the CPU 501 acquires and executes the program 504 that achieves these functions. The program 504 that achieves functions of the components of each device is previously stored, for example, on the storage device 505 or the RAM 503 and is read by the CPU 501, as necessary. Note that the program 504 may be supplied to the CPU 501 via the communication network 509, or may be previously stored on the recording medium 506 and then supplied to the CPU 501 by reading the program by using the drive device 507.

A method for achieving each device includes various modified examples. Each device may be achieved, for example, by any combination of the information processing device 500 and a program separated for each component. Further, a plurality of components included in each device may be achieved by any combination of one information processing device 500 and one program.

Further, a part or all of the components of each device are achieved by a general-purpose or dedicated circuitry including a processor or by a combination thereof. These may include a single chip or may include a plurality of chips connected via a bus. A part or all of the components of each device may be achieved by a combination of the circuitry described above and a program.

When a part or all of the components of each device are achieved by a plurality of information processing devices, circuitries, the plurality of information processing devices, circuitries, may be centralized or distributed. For example, an information processing device, a circuitry, may be achieved as a form in such a way as to be connected to one another via a communication network, such as a client server system and a cloud computing system.

First Example Embodiment

Figure 1:
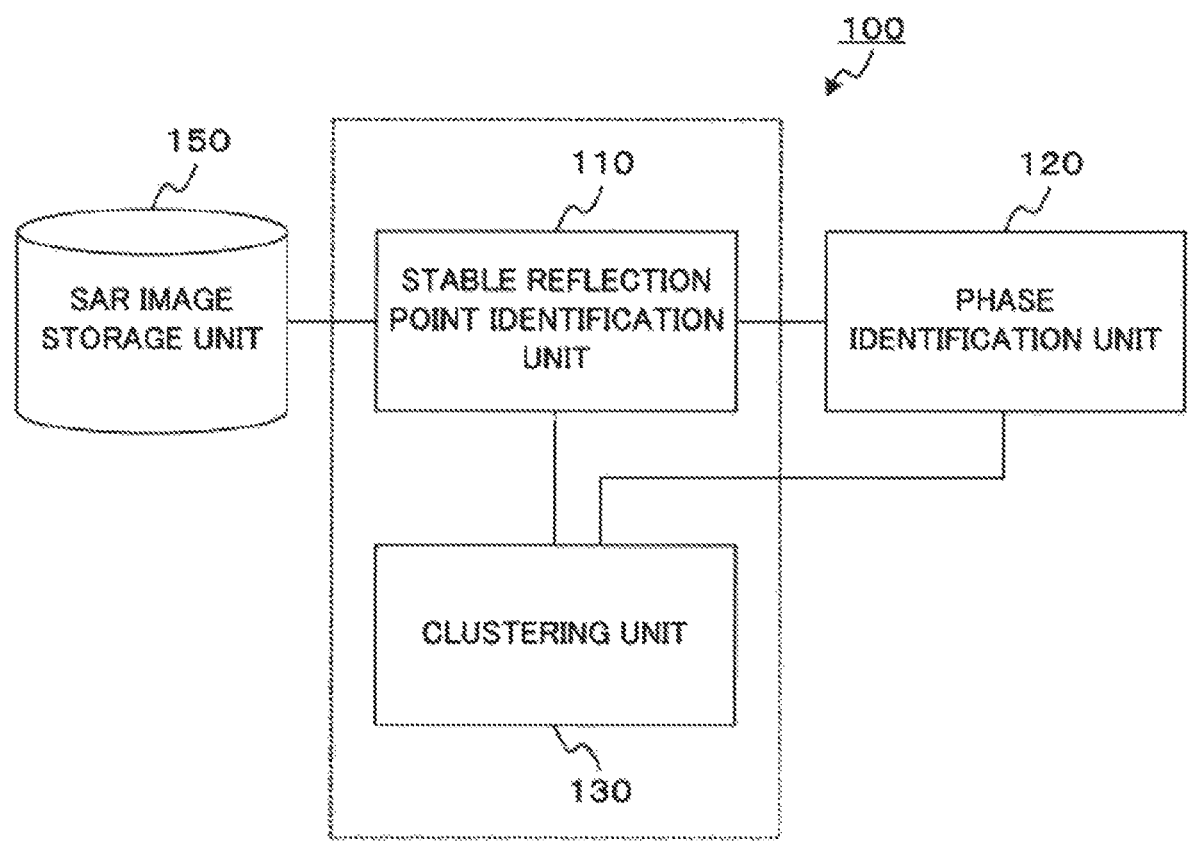
FIG. 1 is a diagram illustrating an image analysis device in a first example embodiment of the present invention.

First, a first example embodiment of the present invention is described. FIG. 1 is a diagram illustrating an image analysis device in the first example embodiment of the present invention.

As illustrated in FIG. 1, an image analysis device 100 in the first example embodiment of the present invention includes, as main elements, a stable reflection point identification unit 110 and a clustering unit 130 that are elements surrounded by a dotted line of FIG. 1. Further, the image analysis device 100 may include a phase identification unit 120 and an SAR image storage unit 150. The stable reflection point identification unit 110 identifies, based on a plurality of SAR images, stable reflection points at which reflection is stable in the plurality of SAR images. The phase identification unit 120 identifies a phase at each of stable reflection points, based on a plurality of SAR images. The clustering unit 130 clusters, based on a Euclidian distance between each of stable reflection points and a correlation of phases at each of the stable reflection points, each of the stable reflection points. The SAR image storage unit 150 stores a plurality of SAR images to be analyzed.

Next, components of the image analysis device 100 in the first example embodiment of the present invention are described.

The stable reflection point identification unit 110 identifies a stable reflection point. A stable reflection point represents one or more pixels in which reflection is stable, in a plurality of SAR images acquired by photographing the same area. A stable reflection point is generally associated with a ground surface, a structural object, a road. The stable reflection point identification unit 110 identifies a stable reflection point by using a well-known technique. As a well-known technique, for example, a technique of permanent scatters interferometry synthetic aperture radar (PSinSAR) analysis described in PTL 1 is used. Further, as a plurality of SAR images, for example, an image previously stored on the SAR image storage unit 150 is appropriately used.

The phase identification unit 120 identifies a phase in each of pixels being a stable reflection point. As identification of a phase, the phase identification unit 120 generates, for each pixel being a stable reflection point, for example, a sequence in which a phase in the pixel of each of a plurality of SAR images is an element. Note that the sequence may be referred to as a phase sequence.

The phase identification unit 120 may determine, as one example of a phase at each stable reflection point, a change between phases of an SAR image being a reference and another SAR image. In this case, of a plurality of SAR images acquired by photographing the same area, an SAR image being a reference is previously determined. The phase identification unit 120 determines a difference of phases between the SAR image being a reference and each of other SAR images and sets the determined difference as an element of a sequence. Further, as another example, the phase identification unit 120 may set phases of a plurality of SAR images as elements of a sequence in a time-series order, without determining an SAR image being a reference.

In the case described above, each phase is expressed in a complex number form in which, for example, an absolute value is normalized to be 1.

Further, the phase identification unit 120 may remove a change between phases changeable depending on an elevation of an object, by using a digital elevation model (DEM). The phase identification unit 120 may remove a change between phases that depend on a fluctuation of the atmosphere, by using a well-known technique. These removals of a change between phases may be appropriately executed depending on an object of observation. When, for example, a road provided on a slope of a mountain is an object, a change between phases changeable depending on an elevation of the object is removed, and thereby clustering in which an influence of the slope is removed becomes possible.

The clustering unit 130 clusters each of stable reflection points. For more detail, the clustering unit 130 clusters each of stable reflection points, by using a position of a pixel being a stable reflection point identified by the stable reflection point identification unit 110 and a correlation of phases identified by the phase identification unit 120. In other words, the clustering unit 130 classifies a plurality of stable reflection points into any number of sets. Note that the clustering unit 130 may cluster each of stable reflection points by using a correlation of phases previously identified by another means without limitation to phases identified by the phase identification unit 120.

Each of a plurality of clustered stable reflection points is commonly related to an object of observation such as a ground surface, a structural object, or a road. Therefore, when stable reflection points are clustered, a stable reflection point identified from an SAR image and an object of observation are easily associated with each other. In the following description, each of sets of clustered stable reflection points may be referred to as a cluster.

In the present example embodiment, the clustering unit 130 executes clustering, by separating, based on each of relations between the stable reflection points determined with use of both a Euclidian distance and a collation of phases described above, the stable reflection points previously connected to each other.

Note that, in the example embodiments of the present invention, each of relations between the stable reflection points is referred to as a distance. In other words, a distance is determined for each of sets of two stable reflection points, using a Euclidian distance between two stable reflection points in an SAR image and a correlation of phases of the two stable reflection points. A distance between two stable reflection points indicates a degree of a relation between the two stable reflection points. Details of the distance are described later.

Figure 2:
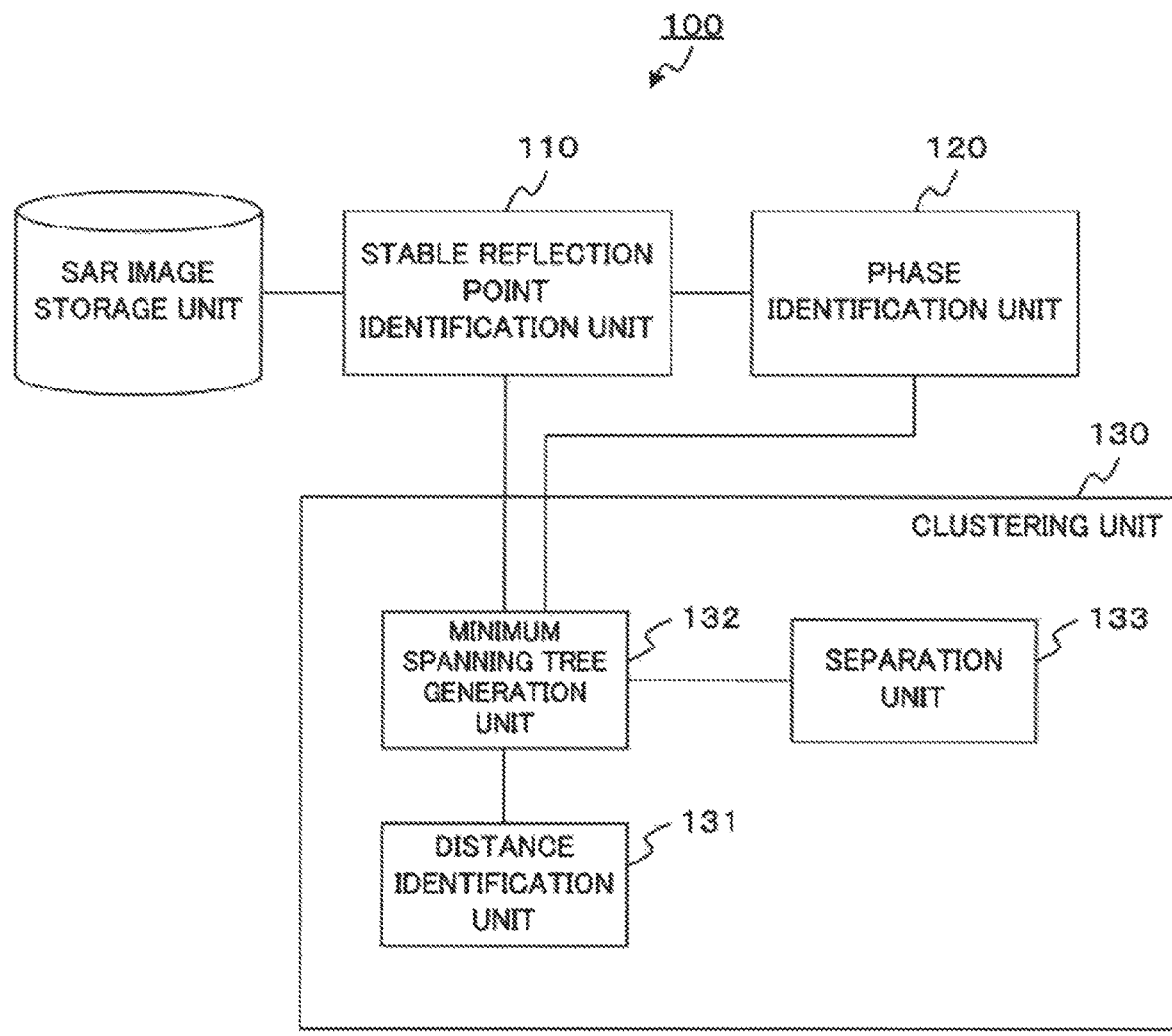
FIG. 2 is a diagram illustrating an example including a detailed configuration of a clustering unit of the image analysis device in the first example embodiment of the present invention.

FIG. 2 is a diagram illustrating one example of a detailed configuration of the clustering unit 130 in the present example embodiment. In the example illustrated in FIG. 2, the clustering unit 130 includes a distance identification unit 131, a minimum spanning tree generation unit 132, and a separation unit 133.

The distance identification unit 131 identifies a distance indicating a relation in each of sets of two stable reflection points, using each of Euclidian distances between stable reflection points and each of correlations of phases in the stable reflection points. The minimum spanning tree generation unit 132 generates a minimum spanning tree relating to stable reflection points, based on the distance determined by the distance identification unit 131. The separation unit 133 separates a minimum spanning tree relating to stable reflection points, based on the distance determined by the distance identification unit 131 and a previously determined threshold. Each of sets of separated stable reflection points is a cluster of stable reflection points.

Figure 3:
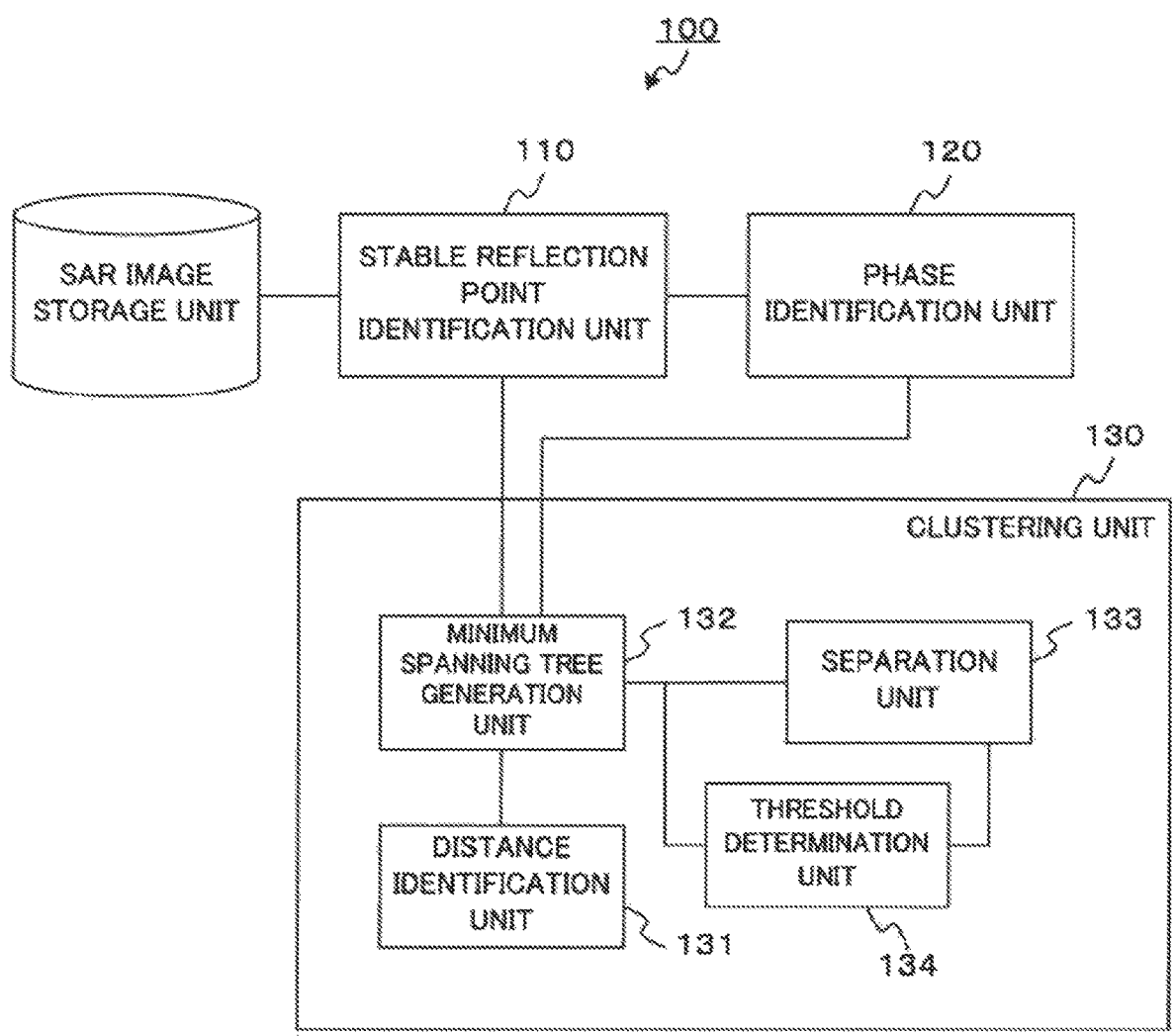
FIG. 3 is a diagram illustrating an example of a distance identification unit included in the image analysis device in the first example embodiment of the present invention.

Note that the clustering unit 130 may further include a threshold determination unit 134 as illustrated in FIG. 3. The threshold determination unit 134 determines, based on a minimum spanning tree, a threshold used when a minimum spanning tree is separated by the separation unit 133.

The elements of the clustering unit 130 illustrated in FIG. 2 are further described. First, the distance identification unit 131 identifies a distance between two stable reflection points. As described above, in the example embodiments of the present invention, a distance between two stable reflection points indicates a degree of a relation between the two stable reflection points. In other words, a distance between two stable reflection points is an indicator indicating that the two stable reflection points are related to different objects (or related to the same object).

It is assumed that, of stable reflection points included in an SAR image, each of any two of stable reflection points has, for example, the following relation. In other words, it is assumed that separated points in an SAR image each are highly likely to be related to different objects, and close points in an SAR image each are highly likely to be related to the same object. Further, it is assumed that points largely different in elevation in an SAR image each are highly likely to be related to different objects, and points having substantially the same elevation in an SAR image each are highly likely to be related to the same object. Similarly, it is assumed that points largely different in displacement in an SAR image each are highly likely to be related to different objects, and points having substantially the same displacement in an SAR image each are highly likely to be related to the same object.

It is conceivable that whether two stable reflection points are separate in an SAR image can be evaluated based on a Euclidian distance between the two stable reflection points in the SAR image. Further, it is conceivable that an evaluation can be made based on elevations of two stable reflection points in an SAR image or a correlation of phases of the two stable reflection points in the SAR image.

Therefore, in the present example embodiment, the distance identification unit 131 determines a distance between any two stable reflection points of a plurality of stable reflection points, using a Euclidian distance between the two stable reflection points and a correlation of phases of the two stable reflection points.

When a distance between two stable reflection points determined by the distance identification unit 131 is relatively large, it is indicated that a relation between the two stable reflection points is weak and the two stable reflection points each are highly likely to be related to different objects. Further, when a distance between two stable reflection points determined by the distance identification unit 131 is small, it is indicated that a relation between the two stable reflection points is strong and the two stable reflection points are highly likely to be related to the same object.

Note that a displacement in the description described above represents a change of a position of an object. When, for example, a structural object such as a building is an object, a displacement occurs due to leaning of a building. Further, when an object is, for example, a ground surface, a displacement occurs due to a ground subsidence, a landslide.

Figure 4:
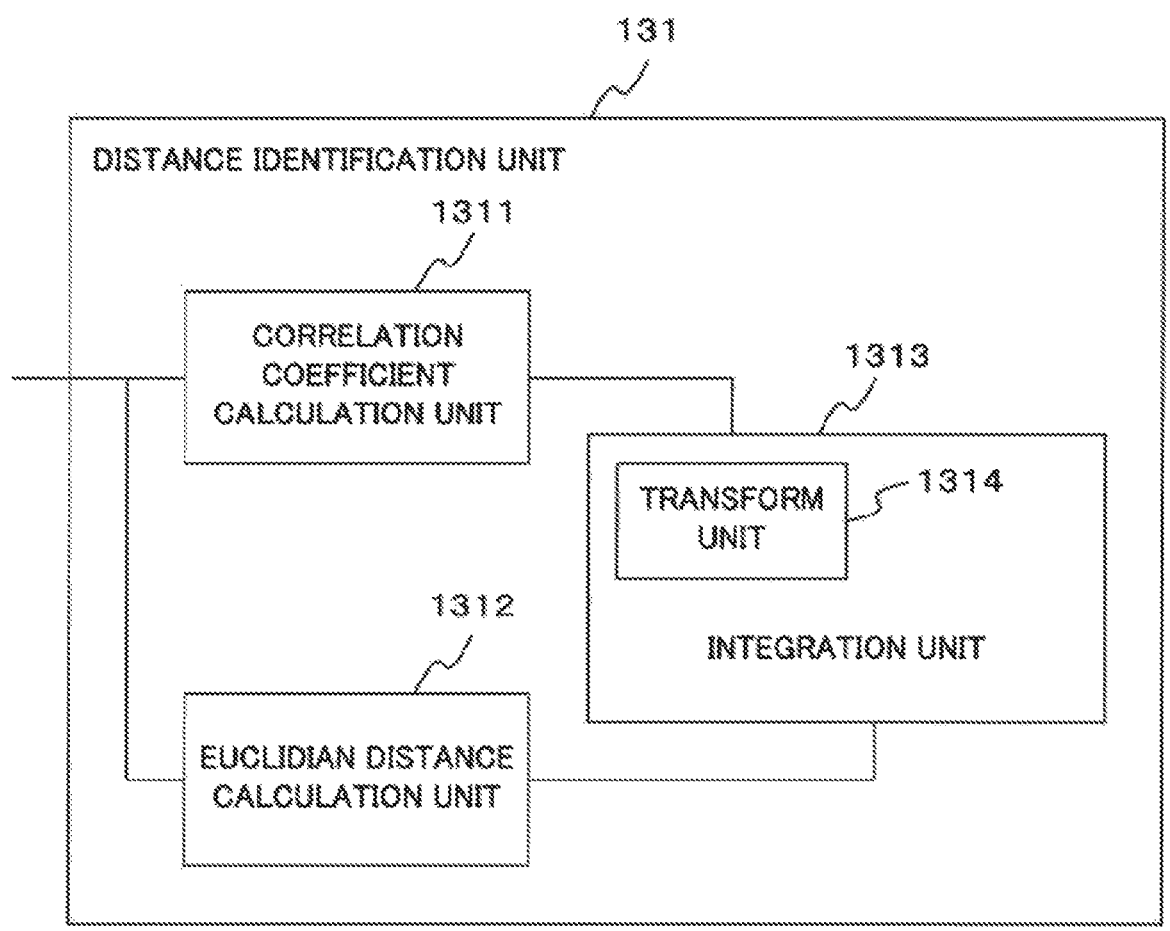
FIG. 4 is a diagram illustrating an example including another detailed configuration of the clustering unit of the image analysis device in the first example embodiment of the present invention.

One example of identification of a distance between two stable reflection points executed by the distance identification unit 131 is further described. In this example, it is assumed that the distance identification unit 131 further includes a configuration as illustrated in FIG. 4. In other words, the distance identification unit 131 includes a correlation coefficient calculation unit 1311, a Euclidian distance calculation unit 1312, an integration unit 1313, and a transform unit 1314.

The correlation coefficient calculation unit 1311 determines a correlation coefficient of phases identified by the phase identification unit 120 for two stable reflection points. The correlation coefficient calculation unit 1311 calculates a correlation coefficient of phases (e.g., each of phase sequences) of two stable reflection points, for example, by using a well-known technique.

The Euclidian distance calculation unit 1312 determines a Euclidian distance between two stable reflection points. The Euclidian distance calculation unit 1312 determines, by using position information including coordinates of two stable reflection points, a Euclidian distance in an image by using a well-known technique.

The integration unit 1313 determines the distance described above, using a correlation coefficient of two stable reflection points determined by the correlation coefficient calculation unit 1311 and a Euclidian distance between the two stable reflection points determined by the Euclidian distance calculation unit 1312.

Note that a distance in the present example embodiment has a small value when a relation between two stable reflection points is strong, as described above. However, a correlation coefficient generally has a large value when a correlation is strong. Therefore, the integration unit 1313 may include the transform unit 1314. The transform unit 1314 transforms a correlation coefficient that has a large value when a correlation is strong in such a way as to be a small value when a correlation is strong.

The integration unit 1313 sets, for example, a product of a correlation coefficient transformed by the transform unit 1314 and a Euclidian distance as the distance described above.

A specific processing of transform executed by the transform unit 1314 is further described. The transform unit 1314 transforms a correlation coefficient by using following equation (1) as one example. In other words, the transform unit 1314 transforms a correlation coefficient by providing a correlation coefficient to the following r. Note that, in the following example, it is assumed that a correlation coefficient determined by the correlation coefficient calculation unit 1311 can take a value equal to or larger than 0 and equal to or smaller than 1.
[Math. 1]

$$\eta_1(r)=1-r \qquad (1)$$

Further, the transform unit 1314 may transform a correlation coefficient by using following equation (2) as one example. Note that γ is a real number larger than 0 and is previously determined. The transform unit 1314 transforms a correlation coefficient by providing a correlation coefficient to the following r.
[Math. 2]

$$\eta_2(r)=r^{-\gamma}-1 \qquad (2)$$

In equation (2), when r approaches 0 from the positive direction, a value diverges to infinity. Therefore, when a correlation of two stable reflection points is weak, the distance described above has a large value. In other words, instead of equation (1) that linearly transforms a value, equation (2) is used in the transform unit 1314, and thereby when a correlation of two stable reflection points is weak, a possibility that two stable reflection points are clustered by the separation unit 133 in such a way as to belong to other clusters is high. In other words, when a correlation of two stable reflection points is weak, a possibility that the two stable reflection points are clustered in such a way as to belong to the same cluster is small.

Note that a degree of the possibility described above is changed by appropriately adjusting a value of γ. When, for example, a value set as γ is large, a possibility that two stable reflection points having a small correlation are clustered in such a way as to belong to the same cluster is small.

Further, the transform unit 1314 may transform a correlation coefficient by using following equation (3) as one example. Also in this case, the transform unit 1314 transforms a correlation coefficient by providing a correlation coefficient to the following r.
[Math. 3]

$$\eta_3(r)=\sqrt{1-r^2} \qquad (3)$$

By using equation (3), processing of the transform unit 1314 can be accelerated, compared with a case where, for example, equation (2) is used.

The integration unit 1313 may determine the distance described above based on processing different from the processing described above. The transform unit 1313 determines a distance, for example, by providing a weight to at least one of a correlation coefficient or a Euclidian distance. By doing in this manner, a distance largely reflected with a value of an indicator heavily weighed is determined between a correlation coefficient and a Euclidian distance. Further, the integration unit 1313 may set a sum of a correlation coefficient transformed by the transform unit 1314 and a Euclidian distance as the distance described above.

Further, a specific processing executed by the integration unit 1313 or the transform unit 1314 is not limited to the example described above. A specific processing executed by the integration unit 1313 or the transform unit 1314 is appropriately selected depending on a policy of separation executed by the separation unit 133 to be described later, an indicator weighed heavily between a correlation coefficient and a Euclidian distance.

Note that the distance identification unit 131 may identify a distance between two stable reflection points, based on a configuration and a procedure different from the configuration and the procedure described above. Further, a distance determined by the distance identification unit 131 may be an indicator indicating a degree of a relation between two stable reflection points.

The minimum spanning tree generation unit 132 generates a minimum spanning tree relating to stable reflection points. In the present example embodiment, the minimum spanning tree generation unit 132 generates a minimum spanning tree, based on each distance between two stable reflection points determined by the distance identification unit 131.

A minimum spanning tree is a tree structure where all stable reflection points identified by the stable reflection point identification unit 110 are connected in such a way that a closed path is not configured, by using branches causing a sum of distances determined by the distance identification unit 131 to be minimum. Note that, in this case, each of branches of a minimum spanning tree is assigned, as a weight, with a distance between two stable reflection points connected to a branch.

The minimum spanning tree generation unit 132 generates a minimum spanning tree by using a well-known technique such as Prim's method or Kruskal's method. In a case based on Prime's method, the minimum spanning tree generation unit 132 generates a minimum spanning tree, for example, as follows.

The minimum spanning tree generation unit 132 first sets one selected stable reflection point as an initial state in a graph among stable reflection points identified by the stable reflection point identification unit 110. The minimum spanning tree generation unit 132 determines a set of two stable reflection points where a distance is minimum between any one of stable reflection points belonging to the graph and any one of stable reflection points not belonging to the graph. The distance is determined by the distance identification unit 131 described above. The minimum spanning tree generation unit 132 adds, to the graph, a branch that connects a stable reflection point not belonging to the graph and two stable reflection point included in the set described above among stable reflection points included in the set described above. The minimum spanning tree generation unit 132 repeats these processings until all stable reflection points belong to the graph. When all stable reflection points belong to the graph described above, the minimum spanning tree generation unit 132 determines the graph as a minimum spanning tree.

The separation unit 133 separates a minimum spanning tree relating to stable reflection points, based on a distance determined by the distance identification unit 131 and a previously determined threshold. The separation unit 133 separates a minimum spanning tree, based on a branch in which a distance is larger than the threshold. Each of separated minimum spanning trees is a cluster of stable reflection points.

In each cluster of stable reflection points, a distance between two stable reflection points connected by a branch has a value smaller than the threshold. In other words, each cluster is a set of a plurality of stable refection points that are close to and are related to each other.

A threshold is previously determined appropriately by a user of the image analysis device 100, for example, according to an object included in an SAR image. The separation unit 133 may output, to any output means including a display, a screen for acquiring a threshold, information of a distance to be referred to upon determination of a threshold.

Further, as described above, the clustering unit 130 may include the threshold determination unit 134 that specifies the threshold described above. The threshold determination unit 134 specifies a threshold, for example, based on an average value and a standard deviation of distances between each of two stable reflection points connected by a branch of a minimum spanning tree.

The clustering unit 130 includes the threshold determination unit 134, and therefore it is unnecessary for a user of the image analysis device 100 to input a threshold. Further, a threshold specified by the threshold determination unit 134 may be further modified by a user of the image analysis device 100. In this case, the threshold determination unit 134 may output, to any output means including a display, a screen for acquiring a modified threshold, information used by the threshold determination unit 134 when specifying a threshold.

Figure 5:
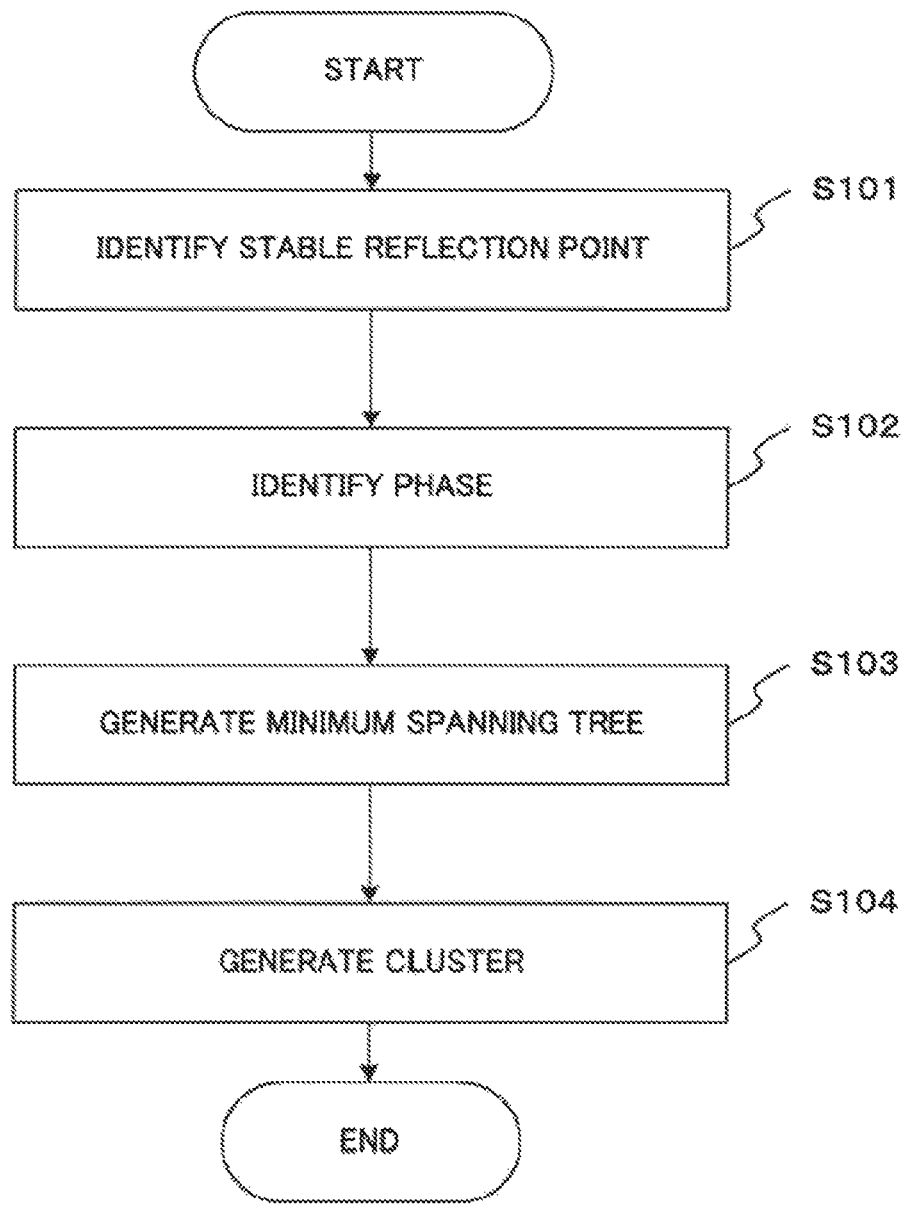
FIG. 5 is a flowchart illustrating an operation of the image analysis device in the first example embodiment of the present invention.

Next, by using a flowchart illustrated in FIG. 5, an operation of the image analysis device 100 in the first example embodiment of the present invention and the minimum spanning tree generation unit 132 included in the clustering unit 130 of the image analysis device 100 is described.

First, the stable reflection point identification unit 110 identifies stable reflection points (step S101).

Next, the phase identification unit 120 identifies a phase at each of the stable reflection points (step S102). The phase identification unit 120 identifies a phase by calculating the phase sequence described above.

Next, in steps S103 and S104, the clustering unit 130 clusters each of the stable reflection points. In step S103, for example, the minimum spanning tree generation unit 132 of the clustering unit 130 generates a minimum spanning tree. Subsequently, in step S104, the separation unit 133 of the clustering unit 130 separates the minimum spanning tree by using a threshold as a criterion and thereby generates a cluster.

Figure 6:
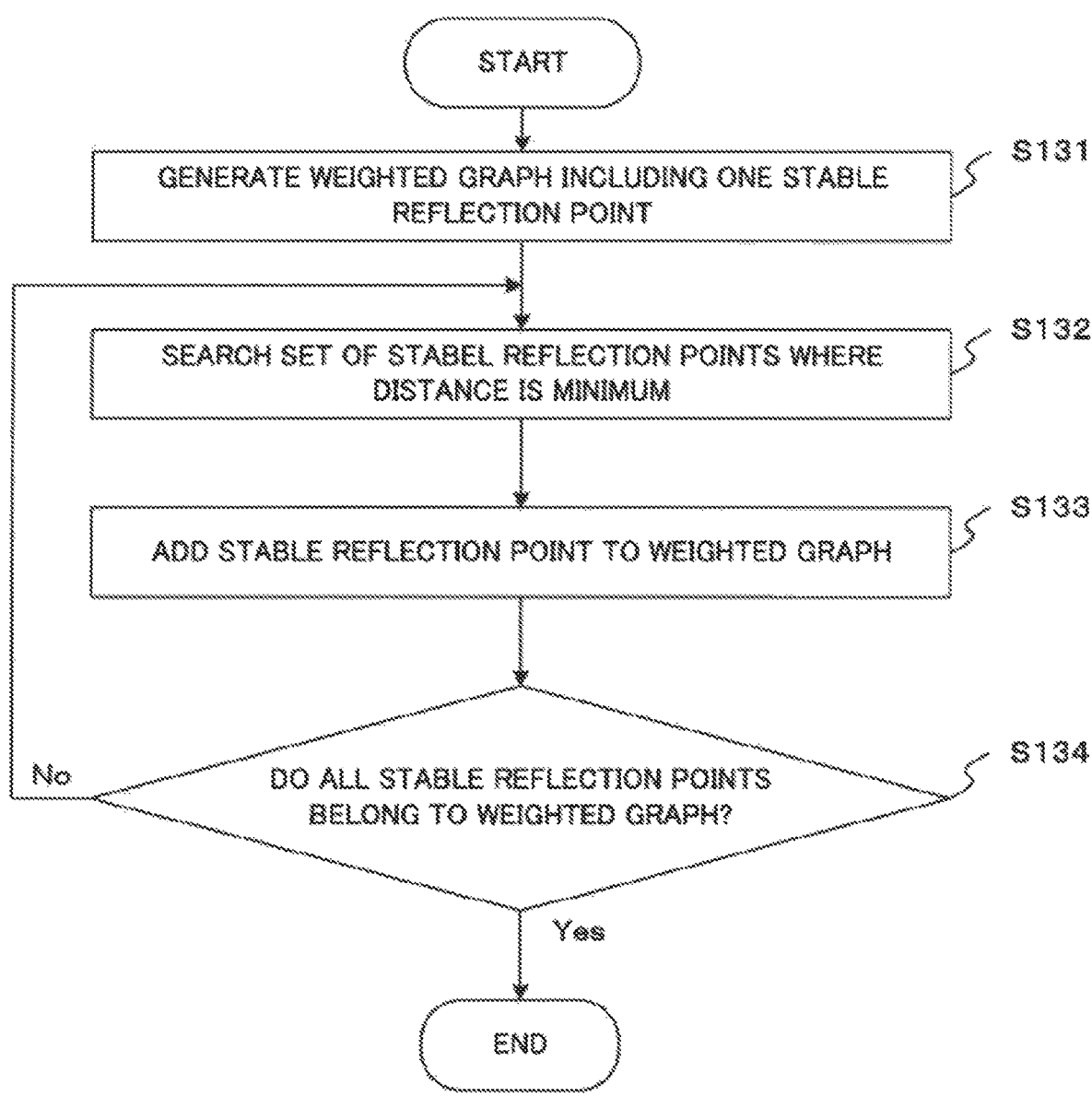
FIG. 6 is a flowchart illustrating an operation of a minimum spanning tree generation unit included in the image analysis device in the first example embodiment of the present invention.

Further, when a minimum spanning tree is generated based on Prim's method, the minimum spanning tree generation unit 132 operates by following a flowchart illustrated in FIG. 6.

First, the separation unit 133 generates a weighted graph by randomly generating one stable reflection point among stable reflection points identified by the stable reflection point identification unit 110 (step S131).

Next, the separation unit 133 executes processing of step S132. In step S132, the separation unit 133 searches a set of two stable reflection points where a distance is minimum between any one of stable reflection points belonging to the weighted graph generated in step S131 and any one of stable reflection points not belonging to the weighted graph. In step S132, a distance is determined by the distance identification unit 131.

Next, the separation unit 133 adds, to the weighted graph, a stable reflection point not belonging to the graph among stable reflection points included in the set searched and determined in step S132 (step S133). Further, the separation unit 133 adds a branch together that connects two stable reflection points included in the set described above to the weighted graph.

Next, the separation unit 133 determines whether all stable reflection points belong to the weighted graph (step S134). When all stable reflection points belong to the weighted graph (step S134: Yes), the separation unit 133 terminates the processing. In this case, each of the separated weighted graphs is a cluster.

On the other hand, when there is a stable reflection point not belonging to the weighted graph (step S134: No), the separation unit 133 continues processing by returning to step S132.

As described above, the image analysis device 100 in the first example embodiment of the present invention clusters each of stable reflection points in a plurality of SAR images, based on a Euclidian distance between each of the stable reflection points and a correlation of phases of each of the stable reflection points.

In general, when a stable reflection point is determined, it is necessary for the stable reflection point to be associated with an object such as a building, a bridge, a road, a ground surface. In this case, it may be difficult to interpret a correspondence between a stable reflection point and the object described above. This results mainly from two causes.

One cause that causes a correspondence between a stable reflection point and an object to be difficult to interpret is a phenomenon referred to as a layover or falling-down. A layover is a phenomenon in which a plurality of stable reflection points located in geographically separate locations appear by being mixed in the same place or close places in an SAR image. This phenomenon occurs since an SAR is an observation means that acquires information according to a distance between an antenna and a reflector.

Figure 7:
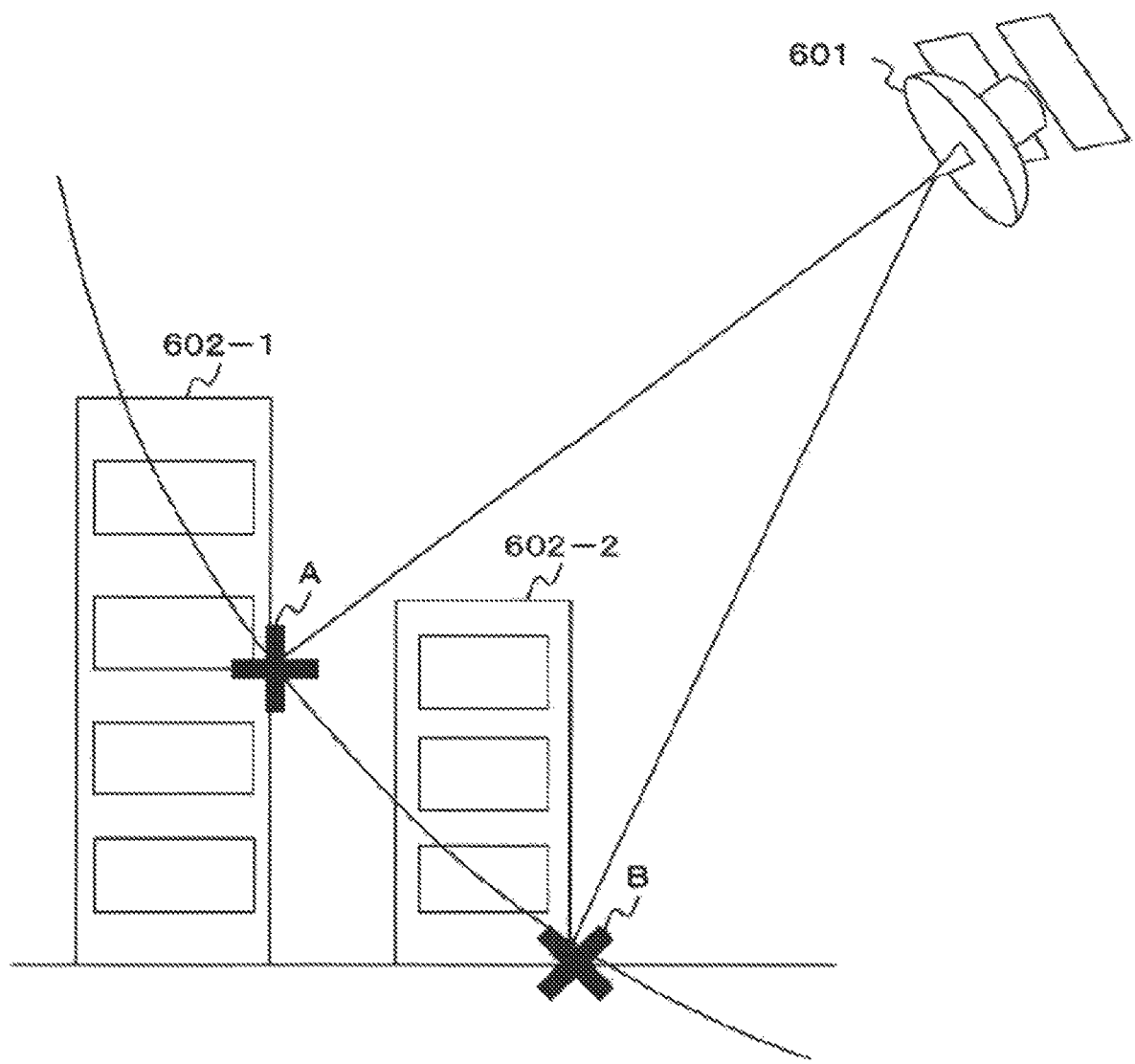
FIG. 7 is a diagram relating to a principle in which, in an SAR image, a layover occurs.

FIG. 7 is a diagram illustrating an example in which a layover occurs. An SAR satellite 601 regards buildings 602-1 and 602-2 as an object of observation. In this case, a point A of the building 602-1 and a point B of the building 602-2 are located at an equal distance from an antenna of the SAR satellite 601. Therefore, the point A and the point B appear by being overlapped in the same location in an SAR image. Such a nature causes association between a stable reflection point and an object to be difficult.

The other cause that causes a correspondence between a stable reflection point and an object to be difficult to interpret is a large number of stable reflection points. By analyzing an SAR image, commonly, a large number of stable reflection points are identified. When each of the stable reflection points is individually associated with an object, a lot of work and a long period of time are necessary.

In contrast, the image analysis device 100 in the present example embodiment clusters each of stable reflection points. By using a cluster of clustered stable reflection points, stable reflection points where a cluster is a unit and an object can be associated with each other. Thereby, a necessity that each of stable reflection points is individually associated with an object decreases.

Further, the image analysis device 100 executes clustering by using a distance determined based on a Euclidian distance between each of stable reflection points and a correlation of phases of each of the stable reflection points. Therefore, the image analysis device 100 can cluster stable reflection points for each structural object even in a shape where a circumference of a structural object being an object is surrounded by another structural object. In other words, even when an event such as a layover occurs, a cluster is generated for each object such as a structural object.

Therefore, the image analysis device 100 eases association between an SAR image and an object.

Second Example Embodiment

Figure 8:
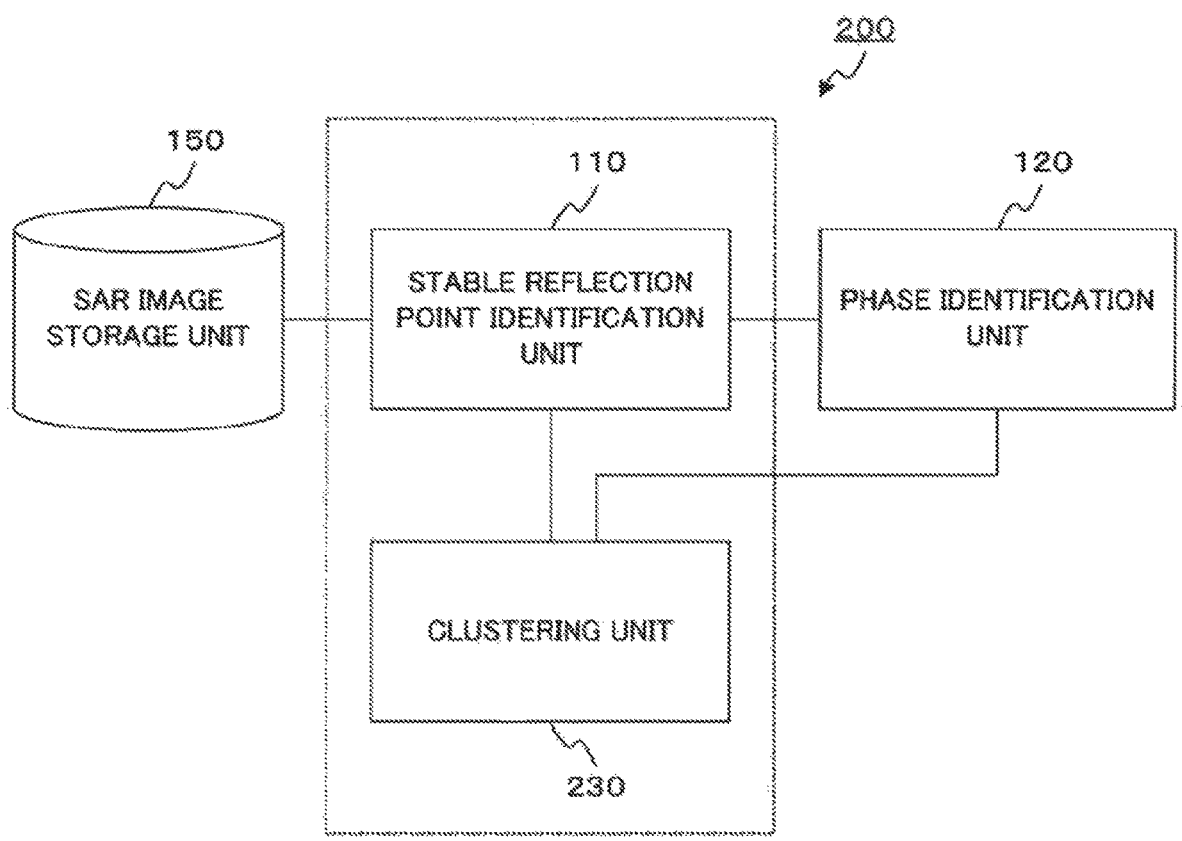
FIG. 8 is a diagram illustrating an image analysis device in a second example embodiment of the present invention.

Next, a second example embodiment of the present invention is described. FIG. 8 is a diagram illustrating an image analysis device in the second example embodiment of the present invention.

As illustrated in FIG. 8, an image analysis device 200 in the second example embodiment of the present invention includes, as main elements, a stable reflection point identification unit 110 and a clustering unit 230 that are elements surrounded by a dotted line of FIG. 8. Further, the image analysis device 200 may include a phase identification unit 120 and an SAR image storage unit 150. The stable reflection point identification unit 110, the phase identification unit 120, and the SAR image storage unit 150 are elements similar to the elements included in the image analysis device 100 in the first example embodiment. The clustering unit 230 clusters stable reflection points, based on a Euclidian distance between each of the stable reflection points and a correlation of phases of each of the stable reflection points.

In other words, the image analysis device 200 in the present example embodiment is different from the image analysis device 100 in the first example embodiment in that instead of the clustering unit 130, the clustering unit 230 is included. Hereinafter, the clustering unit 230 is described.

The clustering unit 230 clusters, similarly to the clustering unit 130 described above, stable reflection points by using a position of a pixel being a stable reflection point identified by the stable reflection point identification unit 110 and a correlation of phases identified by the phase identification unit 120. In the present example embodiment, the clustering unit 230 executes clustering by classifying each of stable reflection points into a previously generated cluster, based on the distance described above determined based on a Euclidian distance and a correlation of phases. Note that the clustering unit 230 may cluster each of stable reflection points by using, without limitation to phases identified by the phase identification unit 120, a correlation of phases previously identified by another means.

Figure 9:
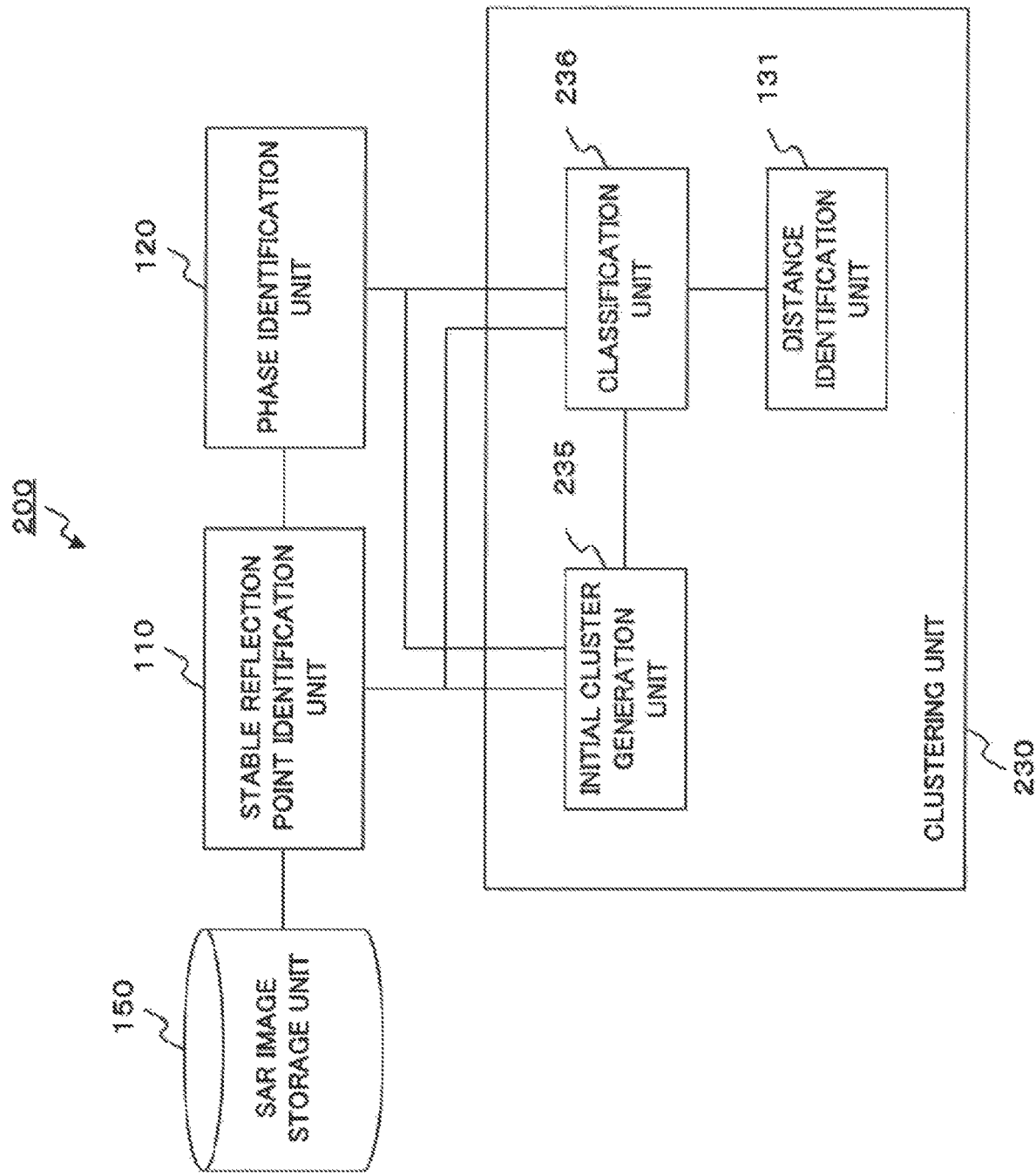
FIG. 9 is a diagram illustrating an example including a detailed configuration of a clustering unit of the image analysis device in the second example embodiment of the present invention.

FIG. 9 is a diagram illustrating one example of a detailed configuration of the clustering unit 230. In the example illustrated in FIG. 9, the clustering unit 230 includes an initial cluster generation unit 235, a distance identification unit 131, and a classification unit 236.

The initial cluster generation unit 235 generates an initial cluster for each of stable reflection points. The distance identification unit 131 is an element similar to the distance identification unit 131 included in the clustering unit 130 of the image analysis device 100 in the first example embodiment. The classification unit 236 classifies each of stable reflection points, based on a distance between a previously generated cluster and each of the stable reflection points. In other words, the classification unit 236 classifies stable reflection points previously classified into a cluster such as an initial cluster into each cluster in such a way that a distance between a cluster and a stable reflection point decreases.

Of the elements of the clustering unit 230 illustrated in FIG. 9, elements except the distance identification unit 131 included in the clustering unit 130 are further described. First, the initial cluster generation unit 235 generates an initial cluster for each of stable reflection points. The initial cluster generation unit 235 generates initial clusters of a number previously designated, for example, by a user of the image analysis device 200. The initial cluster generation unit 235 may generate, when there is no designation for the number of initial clusters to be generated, initial clusters by appropriately determining the number of initial clusters to be generated.

The number of initial clusters to be generated is not specifically limited. The number of initial clusters to be generated may be appropriately determined according to the number of stable reflection points, the number of objects being photographic subjects of an SAR image.

Further, an initial cluster is preferably generated in such a way that each of centroids to be described later are distributed without being biased on coordinates of an SAR image. However, an initial cluster generated by the initial cluster generation unit 235 is not specifically limited.

The classification unit 236 classifies stable reflection points previously classified into a cluster such as an initial cluster being generated into any cluster, based on a distance between a cluster and a stable reflection point. For more detail, the classification unit 236 reclassifies each of stable reflection points classified into the initial cluster described above into a cluster in such a way that a sum of distances decreases in a new cluster. In other words, the classification unit 236 clusters each of stable reflection points acquired from a plurality of SAR images into a cluster optimized from the point of view of the distance described above.

The classification unit 236 classifies stable reflection points, for example, as follows. The classification unit 236 determines a centroid for a cluster such as an initial cluster being generated, for example, by the initial cluster generation unit 235. A centroid is a set of a position and a phase (phase sequence) on an SAR image in which a square sum of distances from each of stable reflection points included in a cluster is minimum. In other words, a centroid is a point to be a center of a cluster from the point of view of distance.

A centroid is determined, and then the classification unit 236 determines a distance between the centroid and each of stable reflection points in each cluster, by appropriately using the distance identification unit 131 described above. The classification unit 236 reclassifies each of stable reflection points into a cluster associated with a centroid in which a distance is shortest. Through this classification, stable reflection points belonging to each cluster are updated.

The classification unit 236 may repeat the operation described above. In other words, the classification unit 236 determines a centroid again for each cluster in which stable reflection points belonging based on reclassification have been updated. The classification unit 236 reclassifies clusters, based on a distance between a newly determined centroid and a stable reflection point.

When the processing described above is repeated, all stable reflection points are classified in such a way as to belong to a cluster in which a distance from a centroid is minimum. In other words, stable reflection points are clustered in such a way that a sum of distances between centroids and stable reflection points in each cluster is optimized. The classification unit 236 determines, when classification is executed in such a way that, for example, stable reflection points belong to a cluster in which a distance from a centroid is minimum, that the classification has been converged and regards each cluster in this case as a result of clustering.

Figure 10:
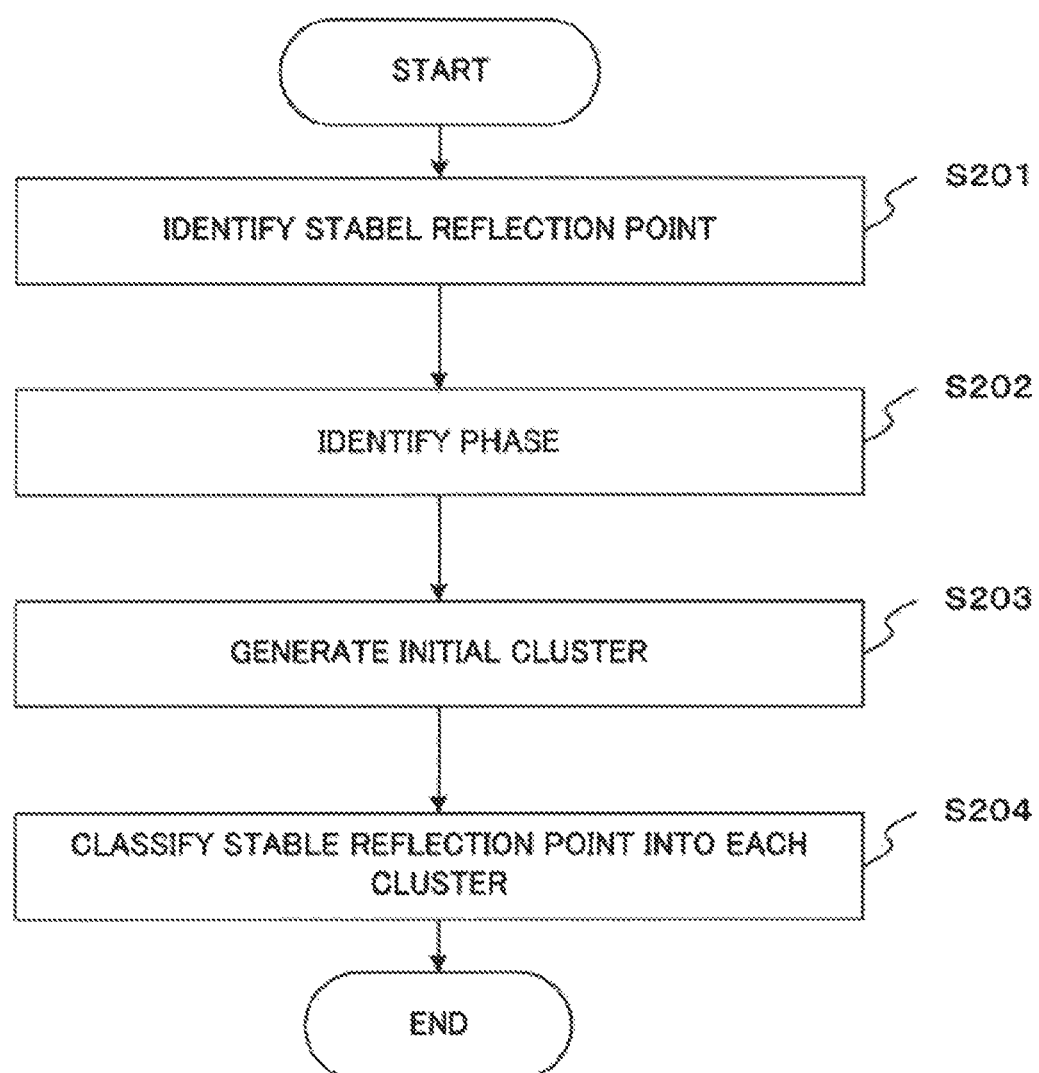
FIG. 10 is a flowchart illustrating an operation of the image analysis device in the second example embodiment of the present invention.

Next, by using a flowchart illustrated in FIG. 10, an operation of the image analysis device 200 in the first example embodiment of the present invention and the classification unit 236 included in the clustering unit 230 of the image analysis device 200 is described.

First, the stable reflection point identification unit 110 identifies stable reflection points (step S201).

Next, the phase identification unit 120 identifies a phase at each of the stable reflection points (step S202). Steps S201 and S202 each operate similarly to steps S101 and S102, respectively, of the image analysis device 100 in the first example embodiment described above.

Next, in steps S203 and S204, the clustering unit 230 clusters each of the stable reflection points. In step S203, for example, the initial cluster generation unit 235 in the clustering unit 230 generates an initial cluster. In step S204 following step S203, the classification unit 236 classifies the stable reflection points into each cluster, based on a distance between a stable reflection point and a centroid of each cluster.

Figure 11:
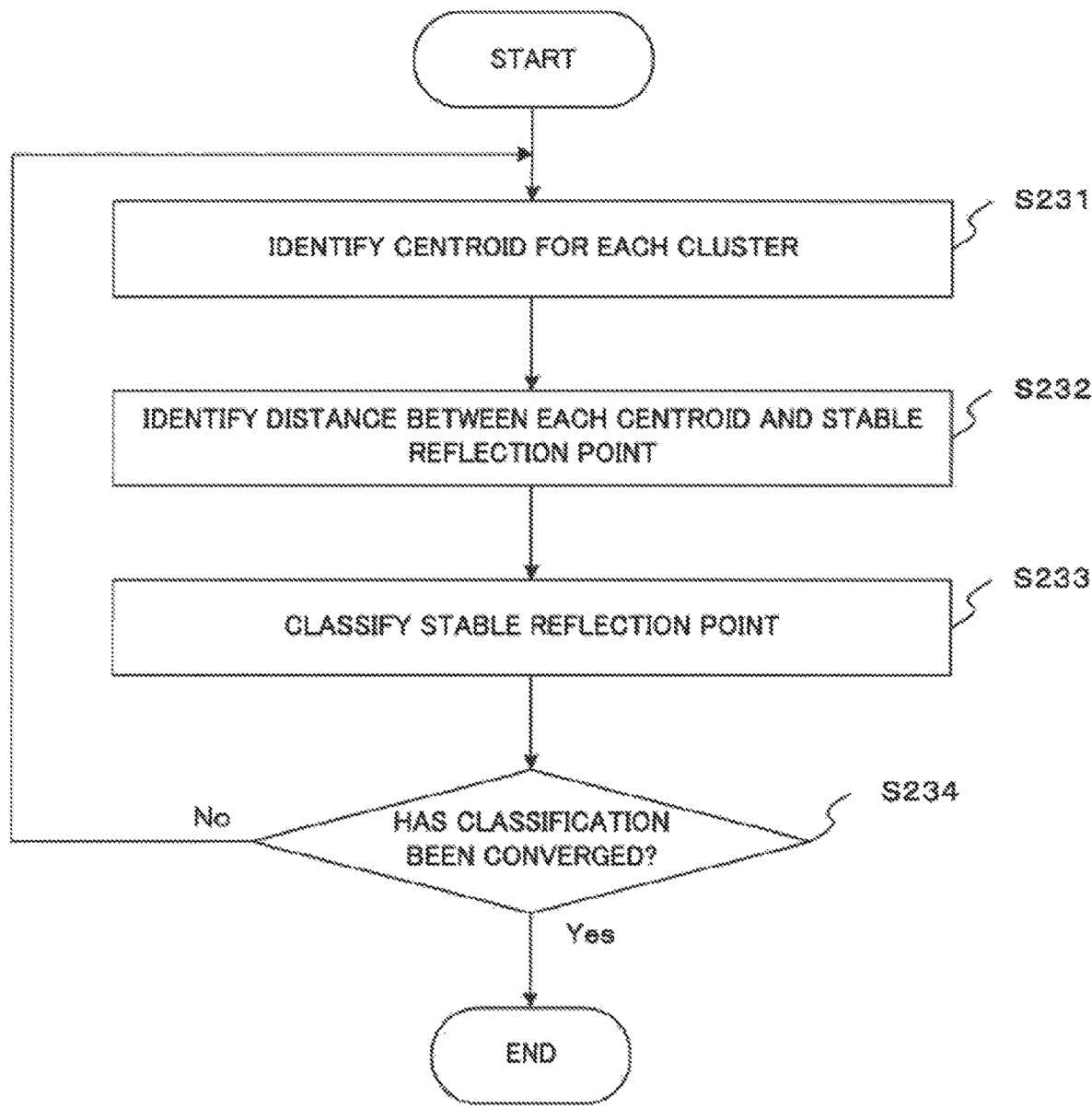
FIG. 11 is a flowchart illustrating an operation of a classification unit included in the image analysis device in the second example embodiment of the present invention.

Further, when the classification unit 236 executes the operation described above, the classification unit 236 operates, for example, by following a flowchart illustrated in FIG. 11.

First, the classification unit 236 determines a centroid for each cluster where an initial cluster generated by the initial cluster generation unit 235 previously exist (step S231).

Next, the classification unit 236 determines a distance between a centroid relating to each cluster determined in step S231 and each stable reflection point (step S232). In step S232, a distance is determined by the distance identification unit 131.

Next, the classification unit 236 classifies stable reflection points into each cluster, based on the distance identified in step S232 (step S233).

Next, the classification unit 236 determines whether classification of stable reflection points into a cluster has been converged (step S234). In other words, the classification unit 236 determines whether stable reflection points have been classified in such a way that a distance between each of stable reflection points and a centroid of a cluster to which the stable reflection points belong is minimum.

When determining that classification of stable reflection points into a cluster has been converged (Step S234: Yes), the classification unit 236 terminates the processing by regarding each cluster of stable reflection points at that time as a result of clustering. When determining that classification of stable reflection points into a cluster has not been converged (Step S234: No), the classification unit 236 returns to step S231 and continues the processing.

Note that, in step S234, the classification unit 236 may determine convergence, based on a criterion different from the criterion described above whether classification has been executed in such a way that a distance between each of stable reflection points and a centroid is minimum.

The classification unit 236 may determine convergence, for example, based on whether processing from step S231 to step S233 has been repeatedly executed at a previously determined number of times. Further, the classification unit 236 may determine convergence, based on whether a distance between each of stable reflection points and a centroid of a cluster to which the stable reflection points belong, a sum of distances, is smaller than a predetermined threshold.

As described above, the image analysis device 200 in the second example embodiment of the present invention clusters each of stable reflection points in a plurality of SAR images, similarly to the image analysis device 100 in the first example embodiment. Therefore, the image analysis device 200 in the present example embodiment produces an advantageous effect similar to the advantageous effect of the image analysis device 100 in the first example embodiment.

Further, the image analysis device 200 in the present example embodiment executes clustering in such a way that a distance relating to a stable reflection point is small in each cluster. Therefore, the image analysis device 200 clusters stable reflection points without generating a huge cluster unnaturally. Further, the image analysis device 200 in the present example embodiment executes clustering by using a previously designated number of initial clusters. Therefore, the image analysis device 200 eases clustering according to the number of objects being photographic subjects of an SAR image.

Third Example Embodiment

Figure 12:
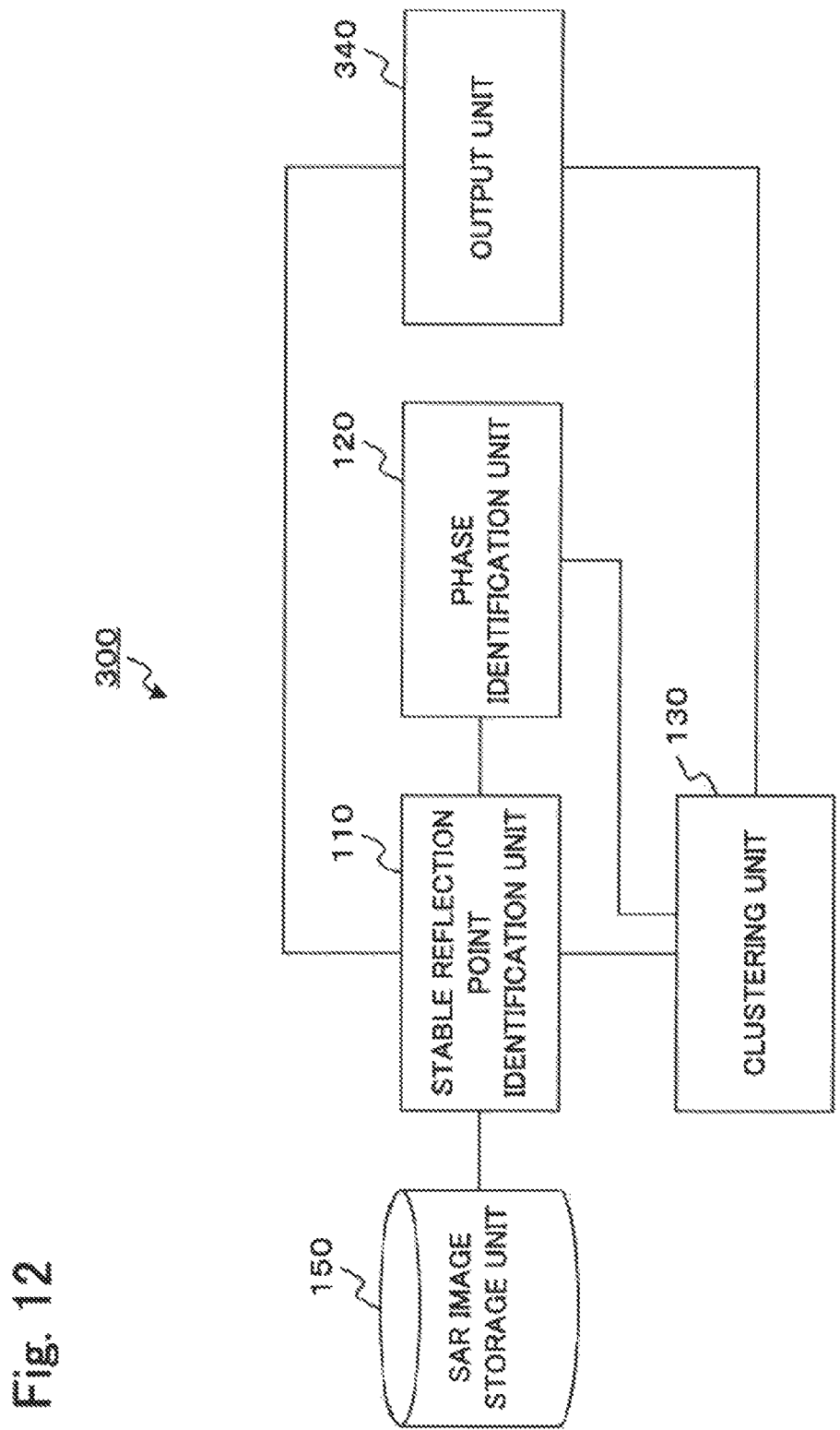
FIG. 12 is a diagram illustrating an image analysis device in a third example embodiment of the present invention.

Next, a third example embodiment of the present invention is described. FIG. 12 is a diagram illustrating an image analysis device in the third example embodiment of the present invention.

As illustrated in FIG. 12, an image analysis device 300 in the third example embodiment of the present invention includes a stable reflection point identification unit 110, a phase identification unit 120, a clustering unit 130, and an output unit 340. The stable reflection point identification unit 110, the phase identification unit 120, and the clustering unit 130 are elements similar to the stable reflection point identification unit 110, the phase identification unit 120, and the clustering unit 130, respectively, described in the first example embodiment described above. The output unit 340 outputs information relating to stable reflection points including clustered stable reflection points.

In other words, the image analysis device 300 in the present example embodiment is different from the image analysis device 100 in the first example embodiment in that the output unit 340 is included.

Figure 13:
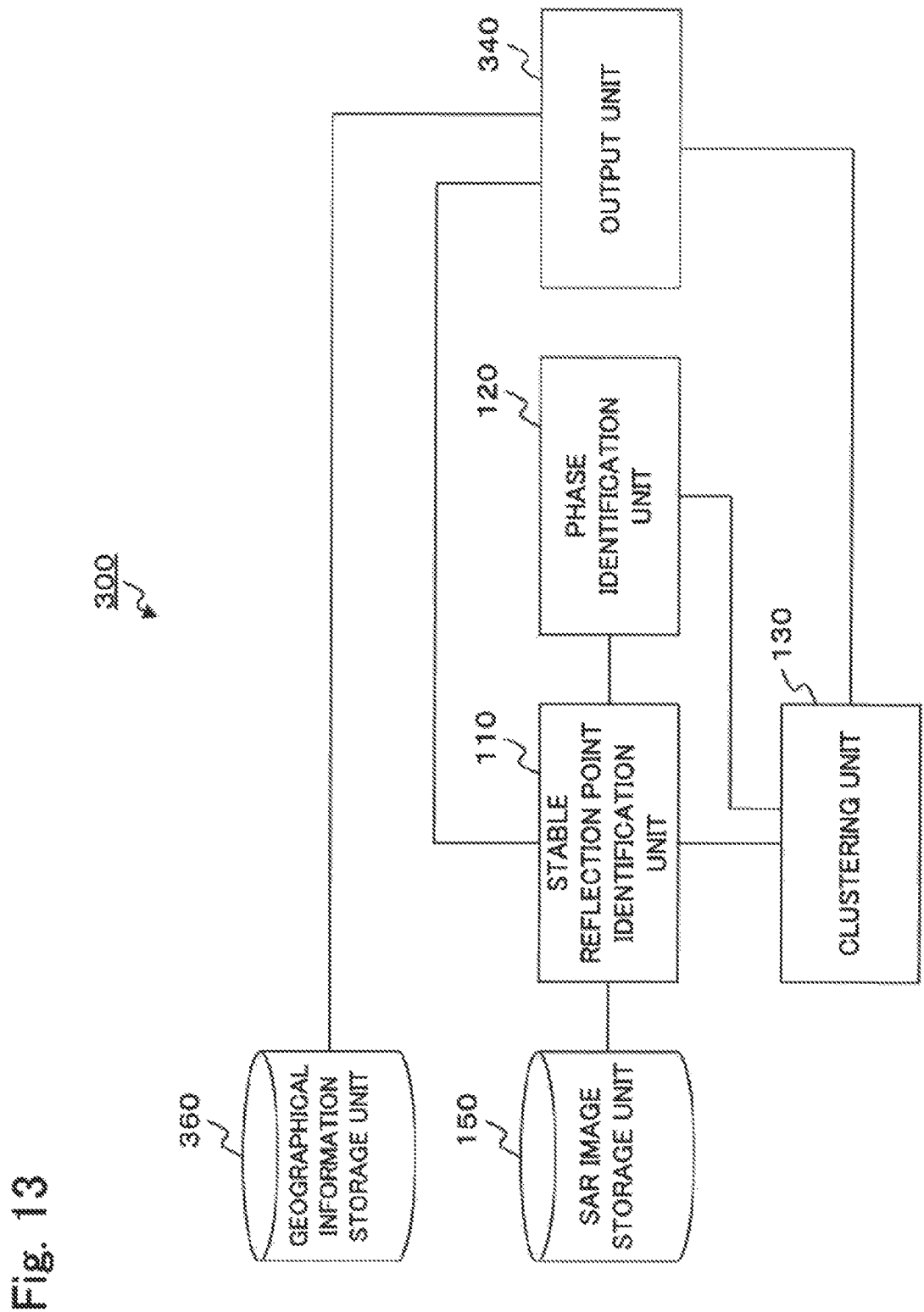
FIG. 13 is a diagram illustrating another example of the image analysis device in the third example embodiment of the present invention.
Figure 14:
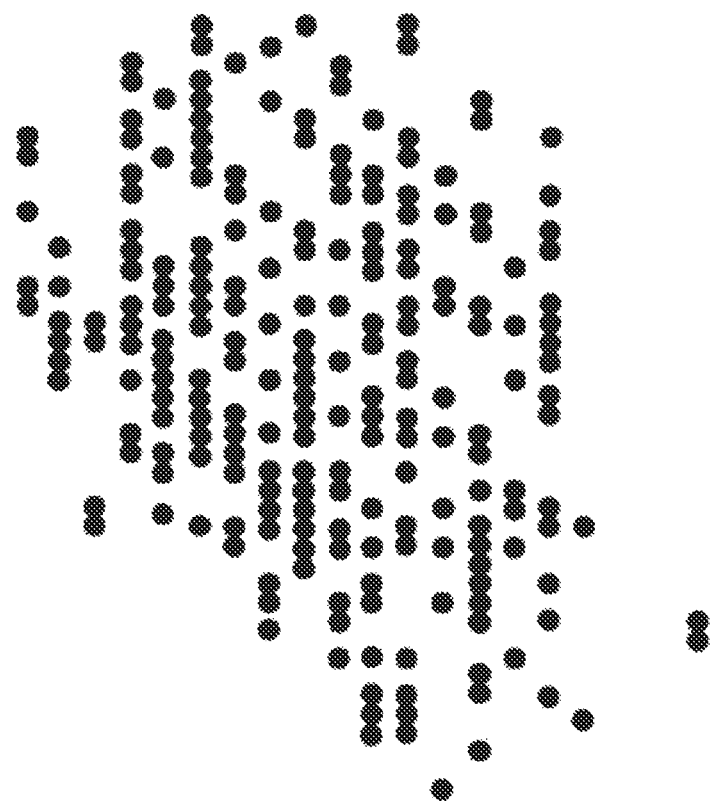
FIG. 14 is a diagram illustrating an example of an object of analysis based on an SAR image.

Note that the image analysis device 300 may further include a geographical information storage unit 360 as illustrated in FIG. 13. The geographical information storage unit 360 stores geographical information. Geographical information is information relating to geography or a space. As geographical information, for example, a map, an aerial photograph, a three-dimensional model of a structural object such as a building, a construction drawing of a structural object, a boring survey result, are included, but information different therefrom may be included in geographical information.

Further, in the present example embodiment, instead of the clustering unit 130, the clustering unit 230 described in the second example embodiment may be used. Further, as a detailed configuration of the clustering unit 130 or 230, the configuration described above may be appropriately used.

Hereinafter, details of the output unit 340 are described. The output unit 340 outputs information such as stable reflection points clustered by the clustering unit 130 or 230 to any output means such as a display. The output unit 340 may output these pieces of information to an output means included in another device via a communication network.

Further, the output unit 340 outputs, for example, stable reflection points clustered by the clustering units 130 or 230 in such a way that division for each cluster is possible. As one example, the output unit 340 outputs stable reflection points for each cluster via color coding.

Further, when the geographical information storage unit 360 is included, the output unit 340 may output stable reflection points, geographical information, together. The output unit 340 may output a map, an aerial photograph, and stable reflection points subjected to color coding for each cluster in an overlapped manner. In this case, position information provided to an SAR image are used, as necessary.

Figure 15:
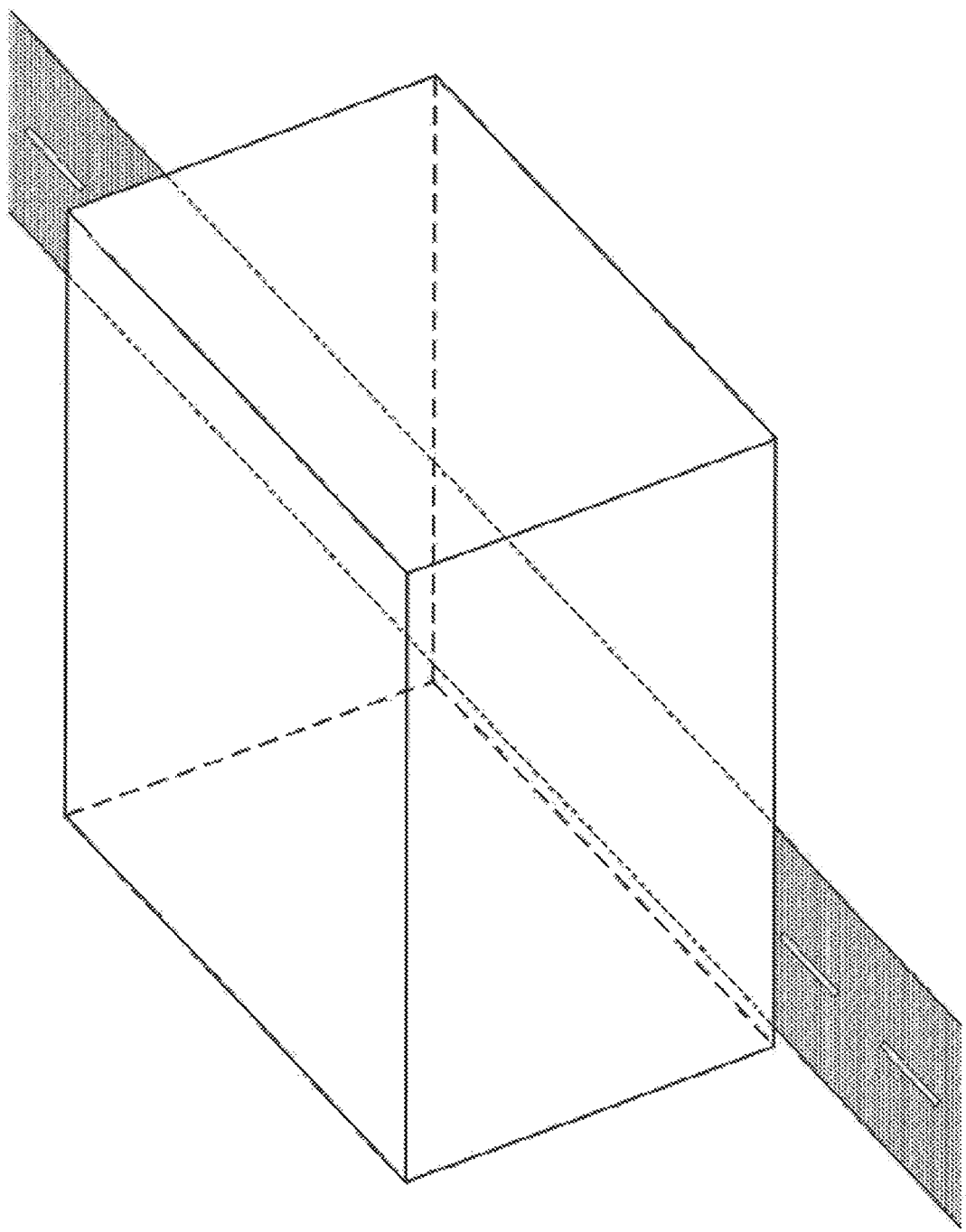
FIG. 15 is a diagram illustrating an example of stable reflection points before clustered.

An example of output executed by the image analysis device 300 and the output unit 340 is further described. In this case, it is assumed that SAR images acquired by photographing the same region at different times of year are objects of analysis. Further, it is assumed that in an SAR image, an area analyzed by an image analysis device includes a road and a building as illustrated in FIG. 15. In other words, the area includes an area where due to an overlay of a building, reflection by the building and reflection by the road are overlapped.

Note that, when the image analysis device 300 includes the geographical information storage unit 360, an image of a building and a road illustrated in FIG. 15 is stored on the geographical information storage unit 360. An image of a building and a road as illustrated in FIG. 15 may be an actually photographed image or an image generated based on geographical information.

Figure 16:
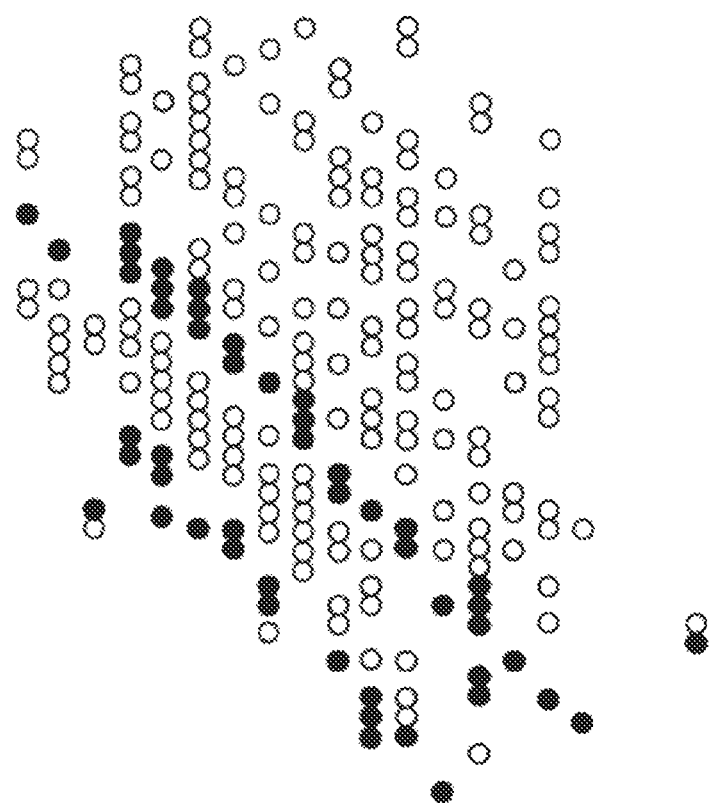
FIG. 16 is a diagram illustrating an example of a stable reflection points after clustered.

In this example, the stable reflection point identification unit 110 identifies stable reflection points as illustrated in FIG. 16. The clustering unit 130 clusters the identified stable reflection points. In this case, it is assumed that stable reflection points are clustered into two clusters.

Figure 17:
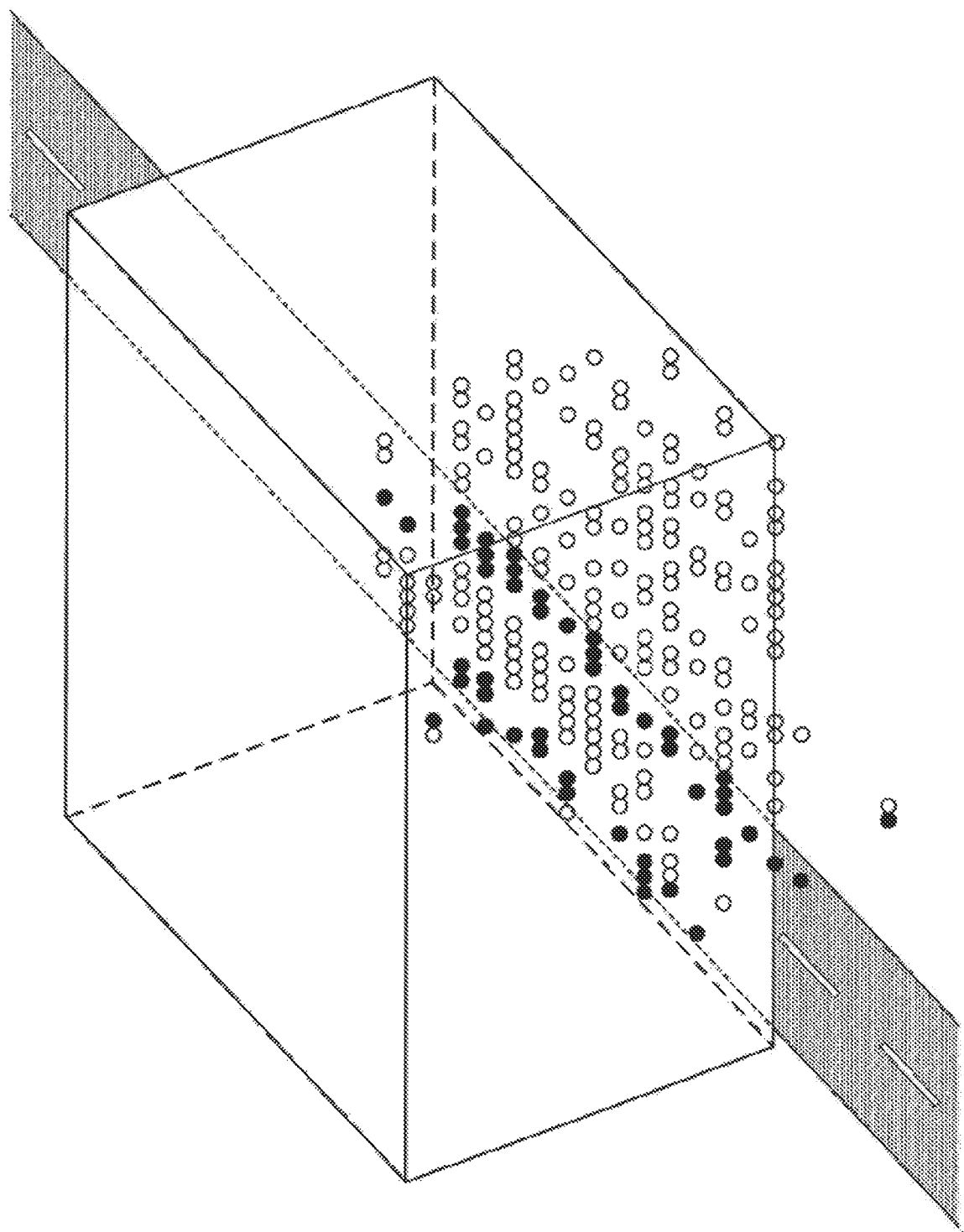
FIG. 17 is a diagram illustrating an example in which stable reflection points after clustered and an object are associated with each other.

With regard to the clustered stable reflection points, the output unit 340 outputs a result of clustering with respect to stable reflection points, for example, as illustrated in FIG. 17. In the example illustrated in FIG. 17, stable reflection points are color-coded for each cluster clustered by the clustering unit 130. In other words, stable reflection points belonging to one cluster are indicated by a black-circle mark and stable reflection points belonging to the other cluster are indicated by a white-circle mark. When a cluster is regarded as a unit, stable reflection points and an object can be efficiently associated.

When comparing the example of a road and a building illustrated in FIG. 15 with the result of clustering illustrated in FIG. 17, a user of the image analysis device 300 can associate stable reflection points with a road or a building for preparation. In other words, stable reflection points indicated by a black-circle mark are associated with the road. Stable reflection points indicated by a white-circle mark are associated with the building.

Further, when the image analysis device 300 includes a geographical information storage unit 360, the output unit 340 may output a result of clustering with respect to stable reflection points and information of a road and a building being geographical information in an overlapped manner, for example, as illustrated in FIG. 17.

As illustrated in FIG. 17, a relation between stable reflection points and an object of a road or a building is visualized. In this manner, when an output illustrated in FIG. 17 is used, stable reflection points and an object can be more efficiently associated with each other.

As described above, in the image analysis device 300 in the third example embodiment of the present invention, the output unit 340 outputs information of clustered stable reflection points. Therefore, stable reflection points are output by the output device 340 by being divided into each cluster. Further, when the image analysis device 300 includes the geographical information storage unit 360, stable reflection points divided into each cluster are output by the output unit 340, for example, by being overlapped with geographical information.

Therefore, the image analysis device 300 in the preset example embodiment eases association between an SAR image and an object.

(Application Examples of an Image Analysis Device)

The image analysis device 100 described above are applied to various images. An application is made when information including a displacement acquired from an SAR image is analyzed in association with data different from an SAR image such as a visible light image. Further, the image analysis device 100 can be used as a display device of an SAR image capable of displaying a difference in a structure by classification and display for each cluster. Further, the image analysis device 100 is applied to an analysis device of an SAR image that executes analysis for each structural object.

Further, the image analysis device 100 can be also applied to an image different from an SAR image.

The image analysis device 100 can be also applied, for example, to analysis of a result of a synthetic aperture sonar using ultrasound.

Further, the image analysis device 100 are also applied to a phase image photographed by a time of flight camera. When the image analysis device 100 is used for phase images observed at a plurality of times, structures having a similar motion can be extracted.

The image analysis device 100 can be also applied to phase imaging using interference of coherent light. The image analysis device 100 are applied, for example, to analysis of a change in a time-series phase with respect to an image photographed by a transmission-type phase imaging method used for measuring a transparent substance such as glass and a cell. When the image analysis device 100 are used, structures different in expansion rate can be extracted.

Further, the image analysis device 100 can be also applied to a phase photographed while changing a polarized wave and observed for a plurality of polarized waves. When the image analysis device 100 are used, sites having anisotropism of a similar refraction index are clustered. In other words, the image analysis device 100 can be used for analyzing a material of a transparent substance and occurring stress and distortion. Further, with regard to reflectiontype phase imaging, the image analysis device 100 are used in an analysis method for a microscopic structure using optical heterodyne.

When a phase that occurs by pattern interference is used, the image analysis device 100 can be also applied to a visible intensity image. When, for example, information is acquired from a phase of a periodical pattern photographed by an imaging element, the image analysis device 100 are used. For more detail, the image analysis device 100 are used in a sampling moire method for measuring distortion by using a phase that occurs due to interference between a periodical pattern resulting from element alignment of imaging elements and a putter of an object. When the image analysis device 100 are used, portions where a similar distortion is occurring can be estimated and structures having different materials can be extracted. Further, when the image analysis device 100 are used for an image in which a phase of a periodical pattern with which an object is irradiated is photographed in a plurality of locations, clustering for each photographed solid can be executed.

While the present invention has been described with reference to example embodiments thereof, the present invention is not limited to the above-described example embodiments. The constitution and details of the present invention can be subjected to various modifications which can be understood by those of ordinary skill in the art in the scope of the present invention. Further, the constitutions in the example embodiments can be combined with one another, without departing from the scope of the present invention.

This application is based upon and claims the benefit of priority from Japanese patent application No. 2016-252479, filed on Dec. 27, 2016, the disclosure of which is incorporated herein in its entirety.

The whole or part of the present invention can be described as, but not limited to, the following Supplementary Notes.

[Supplementary Note 1]
An image analysis device comprising:
stable reflection point identification means for identifying, based on a plurality of synthetic aperture radar (SAR) images, stable reflection points at which reflection is stable in the plurality of SAR images; and
clustering means for clustering each of the stable reflection points, using each of Euclidian distances between the stable reflection points and each of correlations of phases of the stable reflection points.

[Supplementary Note 2]
The image analysis device according to Supplementary Note 1, wherein the clustering means clusters each of the stable reflection points, based on each distance determined by using an Euclidian distance between two stable reflection points and a correlation of the phase of the two stable reflection points.

[Supplementary Note 3]
The image analysis device according to Supplementary Note 2, wherein the clustering means clusters each of the stable reflection points by separating, based on the distance, each of the stable reflection points connected to one another.

[Supplementary Note 4]
The image analysis device according to Supplementary Note 3, wherein the clustering means includes: distance identification means for identifying the distance, using the Euclidian distance and the correlation of the phases;
minimum spanning tree generation means for generating a minimum spanning tree where the stable reflection points are connected in such a way that a sum of the distances is minimum; and separation means for separating the minimum spanning tree, based on a magnitude of the distance.

[Supplementary Note 5]
The image analysis device according to Supplementary Note 2, wherein the clustering means clusters each of the stable reflection points by classifying each of the stable reflection points into a cluster of the stable reflection points.

[Supplementary Note 6]
The image analysis device according to Supplementary Note 5, wherein
the clustering means includes:
initial cluster generation means for generating the cluster of the stable reflection points;
distance identification means for identifying the distance, using the Euclidian distance and the correlation of the phases; and
classification means for classifying the stable reflection points into the cluster, based on the distance between a centroid relating to the distance of the cluster and each of the stable reflection points.

[Supplementary Note 7]
The image analysis device according to any one of Supplementary Notes 1 to 6, wherein
the distance identification unit identifies, using a correlation of the phases relating to each of two stable reflection points and a Euclidian distance between the two stable reflection points in the plurality of SAR images, the distance between the two stable reflection points.

[Supplementary Note 8]
The image analysis device according to any one of Supplementary Notes 1 to 7, further comprising phase identification means for identifying the phase at each of the stable reflection points, based on the plurality of SAR images.

[Supplementary Note 9]
The image analysis device according to any one of Supplementary Notes 1 to 8, further comprising output means for outputting information relating to the stable reflection points being clustered.

[Supplementary Note 10]
The image analysis device according to Supplementary Note 9, wherein the output means outputs information relating to the clustered stable reflection points by overlapping the information with geographical information.

[Supplementary Note 11]
An image analysis method comprising:
identifying, based on a plurality of synthetic aperture radar (SAR) images, stable reflection points at which reflection is stable in the plurality of SAR images; and
clustering each of the stable reflection points, using each of Euclidian distances between the stable reflection points and each of correlations of phases of the stable reflection points.

[Supplementary Note 12]
A computer readable storage medium storing a program which causes a computer to execute processing of:
identifying, based on a plurality of synthetic aperture radar (SAR) images, stable reflection points at which reflection is stable in the plurality of SAR images; and
clustering each of the stable reflection points, using each of Euclidian distances between the stable reflection points and each of correlations of phases of the stable reflection points.

REFERENCE SIGNS LIST

100 Image analysis device
110 Stable reflection point identification unit

120 Phase identification unit
130 Clustering unit
131 Distance identification unit
1311 Correlation coefficient calculation unit
1312 Euclidian distance calculation unit
1313 Integration unit
1314 Transform unit
132 Minimum spanning tree generation unit
133 Separation unit
134 Threshold determination unit
235 Initial cluster generation unit
236 Classification unit
150 SAR image storage unit
360 Geographical information storage unit

The invention claimed is:

1. An image analysis device comprising:
at least one memory; and
at least one processor coupled to the at least one memory,
the at least one processor is configured to perform operations to:
identify, based on a plurality of synthetic aperture radar (SAR) images, stable reflection points at which reflection is stable in the plurality of SAR images; and
cluster each of the stable reflection points, based on each distance determined by using a Euclidian distance between two of the stable reflection points and correlations of phases of two of the stable reflection points,
wherein the distance indicates a degree of a relation between two of the stable reflection points.

2. The image analysis device according to claim 1, wherein
the at least one processor is configured to perform operations to:
cluster each of the stable reflection points by separating, based on the distance, each of the stable reflection points connected to one another.

3. The image analysis device according to claim 2, wherein
the at least one processor is configured to perform operations to:
identify the distance, using the Euclidian distance and the correlation of the phases;
generate a minimum spanning tree where the stable reflection points are connected in such a way that a sum of the distances is minimum; and
separate the minimum spanning tree, based on a magnitude of the distance.

4. The image analysis device according to claim 3, wherein
the at least one processor is configured to perform operations to:
identify, using a correlation of the phases relating to each of two stable reflection points and a Euclidian distance between the two stable reflection points in the plurality of SAR images, the distance between the two stable reflection points.

5. The image analysis device according to claim 2, wherein
the at least one processor is configured to perform operations to:
identify, using a correlation of the phases relating to each of two stable reflection points and a Euclidian distance between the two stable reflection points in the plurality of SAR images, the distance between the two stable reflection points.

6. The image analysis device according to claim 1, wherein
the at least one processor is configured to perform operations to:
cluster each of the stable reflection points by classifying each of the stable reflection points into a cluster of the stable reflection points.

7. The image analysis device according to claim 6, wherein
the at least one processor is configured to perform operations to:
generate the cluster of the stable reflection points;
identify the distance, using the Euclidian distance and the correlation of the phases; and
classify the stable reflection points into the cluster, based on the distance between a centroid relating to the distance of the cluster and each of the stable reflection points.

8. The image analysis device according to claim 7, wherein
the at least one processor is configured to perform operations to:
identify, using a correlation of the phases relating to each of two stable reflection points and a Euclidian distance between the two stable reflection points in the plurality of SAR images, the distance between the two stable reflection points.

9. The image analysis device according to claim 6, wherein
the at least one processor is configured to perform operations to:
identify, using a correlation of the phases relating to each of two stable reflection points and a Euclidian distance between the two stable reflection points in the plurality of SAR images, the distance between the two stable reflection points.

10. The image analysis device according to claim 1, wherein
the at least one processor is configured to perform operations to:
identify, using a correlation of the phases relating to each of two stable reflection points and a Euclidian distance between the two stable reflection points in the plurality of SAR images, the distance between the two stable reflection points.

11. The image analysis device according to claim 1, wherein
the at least one processor is configured to perform operations to:
identify the phase at each of the stable reflection points, based on the plurality of SAR images.

12. The image analysis device according to claim 1, wherein
the at least one processor is configured to perform operations to:
output information relating to the stable reflection points being clustered.

13. The image analysis device according to claim 12, wherein
output information relating to the clustered stable reflection points by overlapping the information with geographical information.

14. An image analysis method comprising:
identifying, based on a plurality of synthetic aperture radar (SAR) images, stable reflection points at which reflection is stable in the plurality of SAR images; and
clustering each of the stable reflection points, based on each distance determined by using a Euclidian distance between two of the stable reflection points and correlations of phases of two of the stable reflection points,
wherein the distance indicates a degree of a relation between two of the stable reflection points.

15. A non-transitory computer readable storage medium storing a program which causes a computer to execute processing of:
  identifying, based on a plurality of synthetic aperture radar (SAR) images, stable reflection points at which reflection is stable in the plurality of SAR images; and
  clustering each of the stable reflection points, based on each distance determined by using a Euclidian distance between two of the stable reflection points and correlations of phases of two of the stable reflection points,
  wherein the distance indicates a degree of a relation between two of the stable reflection points.

\* \* \* \* \*